(12) United States Patent
Neely et al.

(10) Patent No.: US 8,607,967 B2
(45) Date of Patent: Dec. 17, 2013

(54) CONVEYOR BELT LINK WITH ROD RETAINING FEATURE

(75) Inventors: Darroll Joseph Neely, Gerrardstown, WV (US); Joseph A. Bowen, Gore, VA (US)

(73) Assignee: Ashworth Bros., Inc., Winchester, VA (US)

( * ) Notice: Subject to any disclaimer, the term of this patent is extended or adjusted under 35 U.S.C. 154(b) by 0 days.

(21) Appl. No.: 13/311,888

(22) Filed: Dec. 6, 2011

(65) Prior Publication Data

US 2013/0140151 A1 Jun. 6, 2013

(51) Int. Cl.
*B65G 17/06* (2006.01)

(52) U.S. Cl.
USPC .......................... 198/853; 198/850

(58) Field of Classification Search
USPC ................................ 198/850–853
See application file for complete search history.

(56) References Cited

U.S. PATENT DOCUMENTS

| | | |
|---|---|---|
| 4,582,193 A | 4/1986 | Larsson |
| 4,846,339 A | 7/1989 | Roinestad |
| 4,858,753 A | 8/1989 | Hodlewsky |
| 4,949,838 A | 8/1990 | Lapeyre et al. |
| 5,058,732 A | 10/1991 | Lapeyre |
| 5,156,264 A | 10/1992 | Lapeyre |
| 5,335,768 A | 8/1994 | Schladweiler |
| 5,482,156 A | 1/1996 | Damkjaer |
| 5,598,916 A | 2/1997 | Horton et al. |
| 5,645,160 A | 7/1997 | Palmaer et al. |
| 5,904,241 A | 5/1999 | Verdigets et al. |
| 5,954,188 A | 9/1999 | Etherington et al. |
| 5,996,776 A | 12/1999 | van Zijderveld |
| 6,499,587 B1 | 12/2002 | Greve |
| 6,763,936 B2 | 7/2004 | Marsetti et al. |
| 6,814,223 B1 | 11/2004 | Verdigets et al. |
| 6,857,516 B1 * | 2/2005 | Verdigets ...................... 198/850 |
| 7,073,662 B2 | 7/2006 | Neely et al. |
| 7,108,127 B2 | 9/2006 | Krisl |
| 7,255,227 B2 | 8/2007 | Melancon |
| 7,284,657 B2 | 10/2007 | Ulsh et al. |
| 7,530,454 B2 | 5/2009 | Neely et al. |
| 7,766,159 B2 | 8/2010 | Krisl |

OTHER PUBLICATIONS

Pending U.S. Appl. No. 13/311,797, filed Dec. 6, 2011.
Pending U.S. Appl. No. 13/311,882, filed Dec. 6, 2011.
Pending U.S. Appl. No. 13/311,773, filed Dec. 6, 2011.
Pending U.S. Appl. No. 13/311,900, filed Dec. 6, 2011.

(Continued)

*Primary Examiner* — James R Bidwell
(74) *Attorney, Agent, or Firm* — Plumsea Law Group, LLC

(57) ABSTRACT

The present disclosure is directed to a pitch for a modular conveyor belt. In some embodiments, the pitch may include a link having a first leg, including an opening formed in the first leg. The opening may be defined by a first edge, a second edge opposite the first edge, a first side edge, and a second side edge opposite the first side edge. In addition, the pitch may include a projection associated with the first edge. In a first position, the projection may extend substantially perpendicularly away from the first edge towards the second edge so that a free end of the projection is positioned proximate the second edge. Also, the projection may be configured to deflect to a second position, in which the free end of the projection is deflected within the opening towards one of the first side edge and the second side edge.

31 Claims, 22 Drawing Sheets

(56) References Cited

OTHER PUBLICATIONS

Feb. 11, 2013 Office Action, in U.S. Appl. No. 13/311,900, filed Dec. 6, 2011.
May 14, 2013 Office Action, in U.S. Appl. No. 13/311,773, filed Dec. 6, 2011.
May 14, 2013 Office Action, in U.S. Appl. No. 13/311,797, filed Dec. 6, 2011.
May 15, 2013 Office Action, in U.S. Appl. No. 13/311,882, filed Dec. 6, 2011.
International Search Report and Written Opinion mailed Mar. 22, 2013 in International Application No. PCT/US2012/068286.

* cited by examiner

CONVEYOR BELT LINK WITH ROD RETAINING FEATURE

FIELD OF THE INVENTION

The present disclosure is directed to conveyor belt systems, and in particular to modular and grid style conveyor belts. More particularly, the present disclosure is directed to connecting rod retention features for modular conveyor belts.

BACKGROUND

Conveyor belts are widely used today in a variety of industrial applications. For example, conveyor belts are used for material handling and processing applications, as well as a variety of food processing systems.

Since conveyor belt use is widespread, an economical and efficient way of manufacturing conveyor belts is necessary to meet this growing demand. Modular conveyor belts are made from many individual modules that are held in place in relation to one another by a connecting rod. In order to connect these modules to one another, the connecting rod is inserted through transverse apertures through the modules. During assembly of the conveyor belt, as well as during operation of the belt, it is important that the connecting rod is held in place so that the modules are similarly held in place in relation to one another. Lateral movement of the connecting rod may cause the rod to slide out of the aperture resulting in the disassembly of the modular links in the conveyor belt. Unintended lateral movement of the connecting rod as the conveyor belt is being assembled may result in longer assembly times since assembly must be stopped while the connecting rod is reinserted into the adjoining modular links. Unintended lateral movement of the connecting rod as the conveyor belt is in operation may cause two adjacent modular links to separate. The use of the conveyor belt must be halted until the connecting rod is properly reinserted, resulting in a loss of time.

SUMMARY

The present disclosure is directed to systems and methods for securing a connecting rod within a modular conveyor belt. In some embodiments, a flexible projection located in a lateral conveyor belt link prevents the connecting rod from being removed while the conveyor belt is assembled or operated. The flexible projection may prevent the rod from being removed by blocking an aperture in the conveyor belt link, or by preventing movement of the connecting rod in a removal direction. The flexible projection is intended to be easily but intentionally moved in a direction perpendicular to the long axis of the rod. In some embodiments, the flexible projection may extend substantially perpendicularly from an edge of an opening in the conveyor belt link. The flexible projection may have little or no curvature when no external forces are being applied.

In one aspect, the present disclosure is directed to a pitch for a modular conveyor belt. The pitch may include a link having a first leg, including an opening formed in the first leg. The opening may be defined by a first edge, a second edge opposite the first edge, a first side edge, and a second side edge opposite the first side edge. In addition, the pitch may include a projection associated with the first edge. In a first position, the projection may extend substantially perpendicularly away from the first edge towards the second edge so that a free end of the projection is positioned proximate the second edge. Also, the projection may be configured to deflect to a second position, in which the free end of the projection is deflected within the opening towards one of the first side edge and the second side edge.

In another aspect, the present disclosure is directed to a pitch for a conveyor belt. The pitch may include a link having a first leg and a retention cage extending away from the first leg. The retention cage may include a first side formed by at least part of the first leg of the link, a front side extending in a substantially lateral direction away from the first leg of the link, a rear side extending substantially laterally from the first leg of the link, and a laterally outer side connecting the front side and the rear side of the retention cage such that the first side, front side, rear side, and laterally outer side define an interior portion. The laterally outer side may include an opening configured to receive a connecting rod. In addition, the pitch may include a resilient projection extending in a longitudinal direction from the front side or the rear side of the retention cage into the interior portion of the retention cage. The resilient projection may be configured to, in a first undeflected position, prevent insertion and removal of a connecting rod through the opening and, in a second deflected position wherein the projection is deflected in a direction perpendicular to the substantially lateral direction, the projection allows insertion and removal of a connecting rod through the opening.

In another aspect, the present disclosure is directed to a conveyor belt. The conveyor belt may include an elongated rod having a long axis and a first link having a retention cage extending away from a first leg. The conveyor belt may also include an opening formed in the retention cage. The opening may be defined by a first edge, a second edge opposite the first edge, a first side edge, and a second side edge opposite the first side edge. In addition, the conveyor belt may include a projection associated with the first edge, wherein the projection extends away from the first edge towards the second edge so that a free end of the projection is positioned proximate the second edge. The conveyor belt may also include a first link aperture formed through the first leg, wherein the first link aperture aligns with the opening. Further, the conveyor belt may include a second link configured to be associated with the first link using the rod, wherein a second link aperture is formed in the second link so that the second link aperture is configured to align with the opening and the first link aperture to form a rod insertion path. In some embodiments, the rod may be disposed within the rod insertion path. Further, in an initial position, the projection may extend substantially perpendicularly away from the first edge and retains the rod within the rod insertion path. In addition, the projection may be configured so that a free end of the projection is movable, in a direction substantially perpendicular to the long axis of the rod towards one of the first side edge and the second side edge, to a second position within the opening, wherein, in the second position, the projection allows the rod to be removed or inserted through the opening.

In another aspect, the present disclosure is directed to a method for assembling a conveyor belt. The method may include providing an end link having a first opening on a first side of the end link and a second opening on a second side of the end link, wherein a flexible projection extends in a first position from an inner surface of the end link proximate the second opening so that in the first position the flexible projection is configured to prevent objects from entering the second opening. The flexible projection may be substantially parallel to the second side of the end link. The method may also include providing a connecting rod, wherein the connecting rod is an elongated member having a first rod end and a second rod end. In addition, the method may include applying a force to the flexible projection to move a free end of the flexible projection to a second position proximate a side of the second opening, wherein the flexible projection is moved in a first direction, wherein the first direction is substantially perpendicular to the second side of the end link. Further, the method may include inserting the first rod end into the second opening, wherein the connecting rod is inserted in a second direction, wherein the second direction is substantially perpendicular to the first direction. The method may also include moving the first rod end into the first opening in the end link so that the second rod end is positioned proximate the second opening within the end link and releasing the force applied to the flexible projection so that the flexible projection returns to the first position to retain the connecting rod within the end link.

In another aspect, the present disclosure is directed to a pitch for a modular conveyor belt. The pitch may include a link having a first leg. The first leg may include an opening extending through the first leg in a lateral direction and configured to receive a connecting rod. In addition, the first leg may also include a slit extending from a free end of the first leg in a longitudinal direction at least to the opening. The opening may include a shoulder configured to prevent retraction of a connecting rod once inserted substantially through the opening.

In another aspect, the present disclosure is directed to a modular conveyor belt. The conveyor belt may include a connecting rod, a first pitch, and a second pitch configured to be connected to the first pitch by the connecting rod. The first pitch may include a link having a first leg, the first leg including an opening extending through the first leg in a lateral direction and configured to receive the connecting rod. The first leg may also include a slit extending from a free end of the first leg in a longitudinal direction at least to the opening, wherein the opening includes a shoulder configured to prevent retraction of the connecting rod once inserted substantially through the opening.

Other systems, methods, features and advantages of the current embodiments will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The current embodiments can be better understood with reference to the following drawings and description. The components in the figures are not necessarily to scale, emphasis instead being placed upon illustrating the principles of the current embodiments. Moreover, in the figures, like reference numerals designate corresponding parts throughout the different views.

DETAILED DESCRIPTION

Embodiments provide systems and methods for preventing a connecting rod from being removed from a conveyor belt assembly. The presently disclosed conveyor belt concepts, such as rod retention features, are generally applicable to a wide range of modular conveyor belt configurations.

Figure 1:
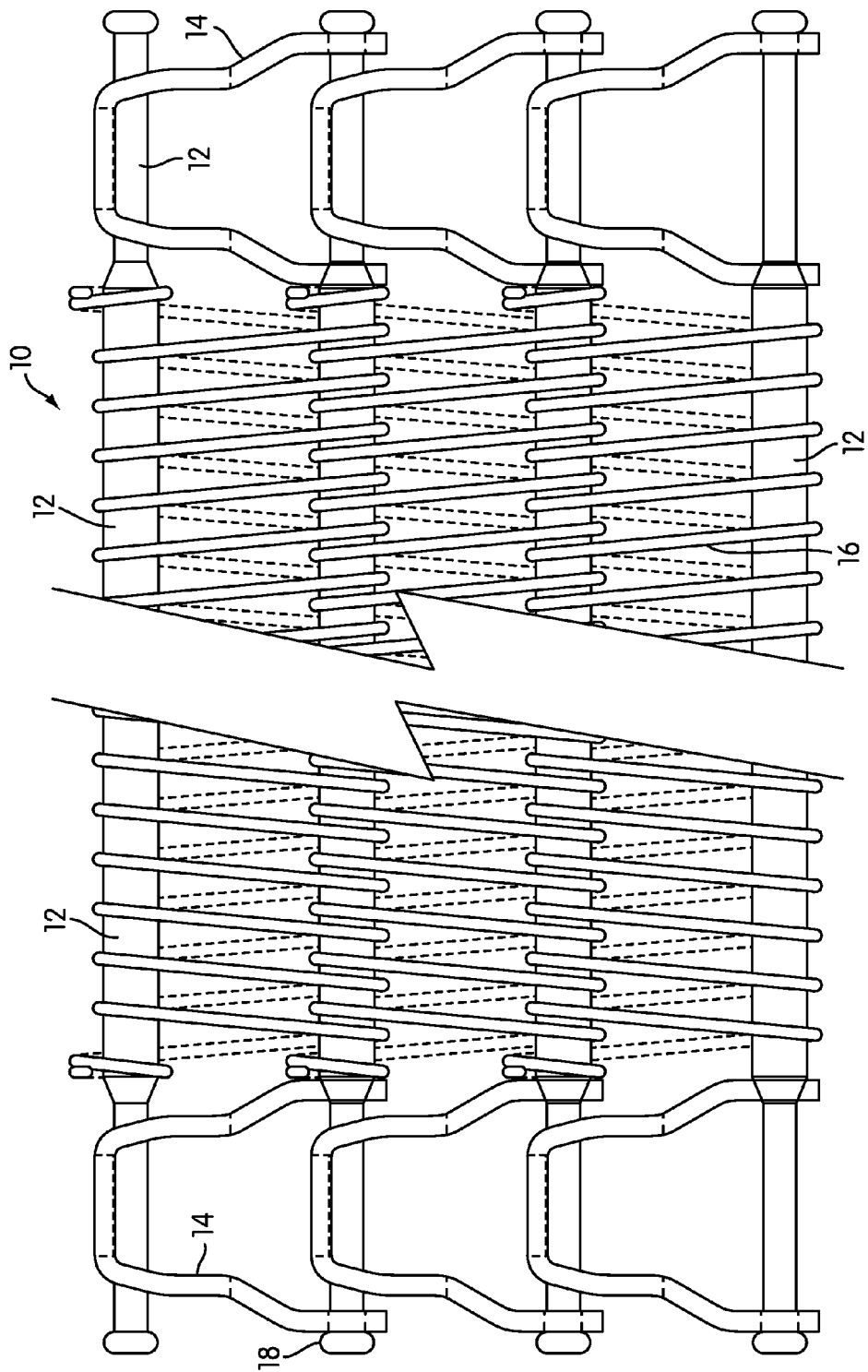
FIG. 1 is an illustration of an exemplary modular conveyor belt.

Examples of basic conveyor belt structures and manufacturing methods can be found in U.S. Pat. No. 5,954,188, which is incorporated herein by reference. The accompanying FIG. 1 corresponds to FIG. 1 of the '188 patent, and illustrates a typical prior art modular conveyor belt 10. Conveyor belt 10 includes rods 12 connected by links 14 and covered by a mesh 16 to provide additional support for the goods transported on conveyor belt 10.

In some cases, a buttonhead 18 may be formed on the ends of rods 12 to act as a stop for links 14. A weld is also typically formed between buttonhead 18 and link 14 for a stronger and more secure connection between rods 12 and links 14. In other cases, a buttonless configuration may be employed, wherein the rod is welded to the link without creating a significant protrusion beyond the leg of the link.

Figure 2:
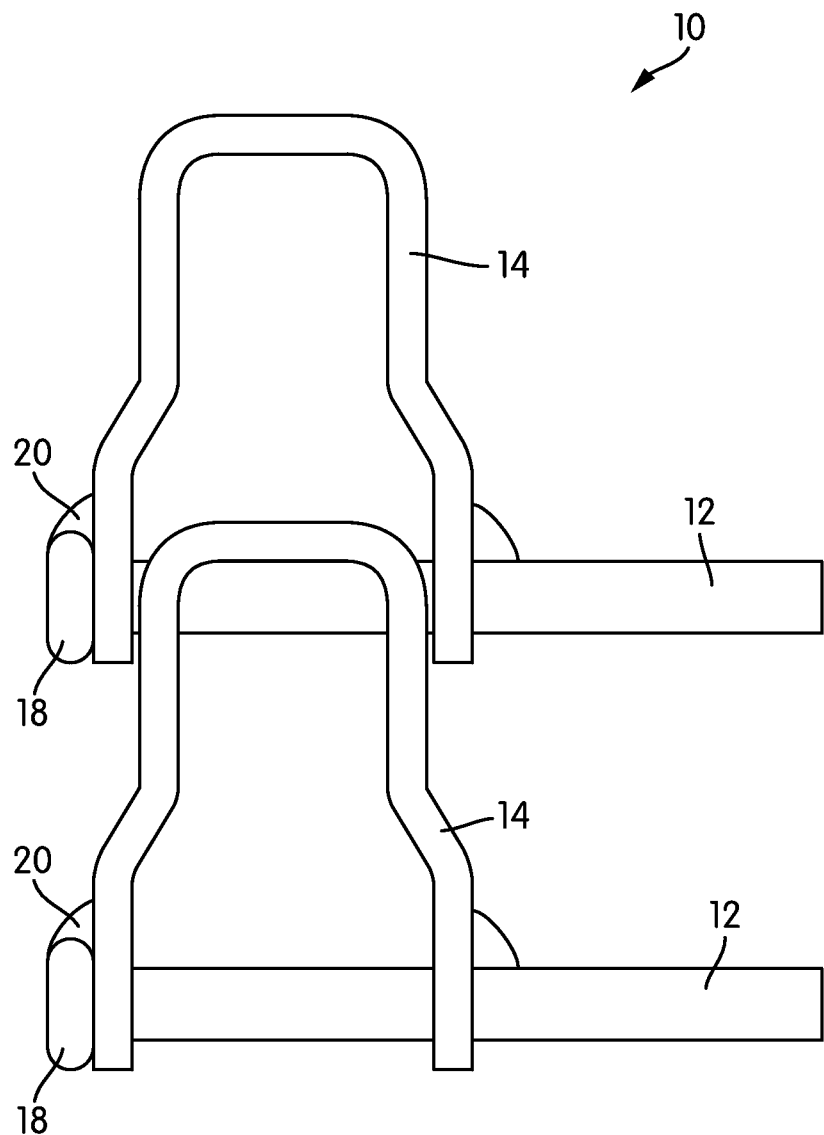
FIG. 2 is an enlarged view of a portion of the conveyor belt shown in FIG. 1.

FIG. 2 shows an enlarged view of a portion of prior art conveyor belt 10, showing rods 12 formed with buttonheads 18. In addition, FIG. 2 also shows a weld 20 fastening buttonhead 18 and, therefore, rod 12, to link 14.

The term "conveyor belt," as used in the present disclosure, generally refers to any type of endless track or belt, typically configured to be driven by a geared mechanism or drum. The term "conveyor belt" should not be considered to be limited to any particular type of conveyor belt unless otherwise specified herein.

The directional term "lateral" or "laterally," as used in the present disclosure, refers to an outwardly direction relative to the centerline of the entire conveyor belt.

The term "longitudinal" as used in the present disclosure and claims refers to a direction in which the conveyor belt travels. Further the term longitudinal refers to both forward and backward directions of conveyor belt travel.

The term "vertical," as used in the present disclosure and claims refers to the up and down direction relative to the ground.

The conveyor belt systems, and methods of building such systems, as described herein, may include different types of conveyor belts. In some embodiments, the conveyor belts may be modular conveyor belts. Modular belts may be formed of intermeshing modules, disposed in laterally extending rows, that are rotatably joined longitudinally. In some cases, a row of a modular belt may include multiple modules disposed laterally, and joined, for example, by a connecting rod. Modular belt modules may include laterally-aligned rod holes or slots at the forward and rearward portions of each row.

The term "link," as used in the present disclosure and claims, refers to a basic component of a conveyor belt row. For example, one individual link may be repeated laterally in order to form an entire row of links. In some embodiments, only two links per row are provided (at each end of the rod). In some embodiments, the links are capable of rotating independently from one another. In some embodiments, two or more links may be rigidly attached to one another.

The term "rod" or "connecting rod" refers herein to an elongated member used to associate links together. When associated, the links and rod form a basic modular conveyor belt.

The term "pitch" refers herein to one row of links extending from one lateral edge of the conveyor belt to the opposite lateral edge. In some embodiments, the pitch may be formed of one piece so that all the links in the same row are rigidly attached to one another. In other embodiments, the pitch may have multiple individual links arranged side-to-side, allowing each individual link to rotate with respect to one another. In other embodiments, the pitch may include a minimal number of links, such as only end links connected by connecting rods. In some embodiments, the pitch may include not only end links, but also one or more spaced-apart intermediate links positioned between the end links along the connecting rod.

The term "end link" refers herein to the most laterally disposed link in the pitch, or the terminating link for the pitch in a row. In some embodiments each pitch may have two end links, one end link for each side of the conveyor belt.

The term "retention cage" refers herein to a structure that is associated with the end link such that the retention cage is located on the side of the end link that is outward from the centerline of the conveyor belt. In other words, the retention cage forms the edge of the conveyor belt. In some embodiments, the retention cage secures the connecting rod so that the rod is not inadvertently removed from the conveyor belt during operation, assembly, or any other time.

Figure 3:
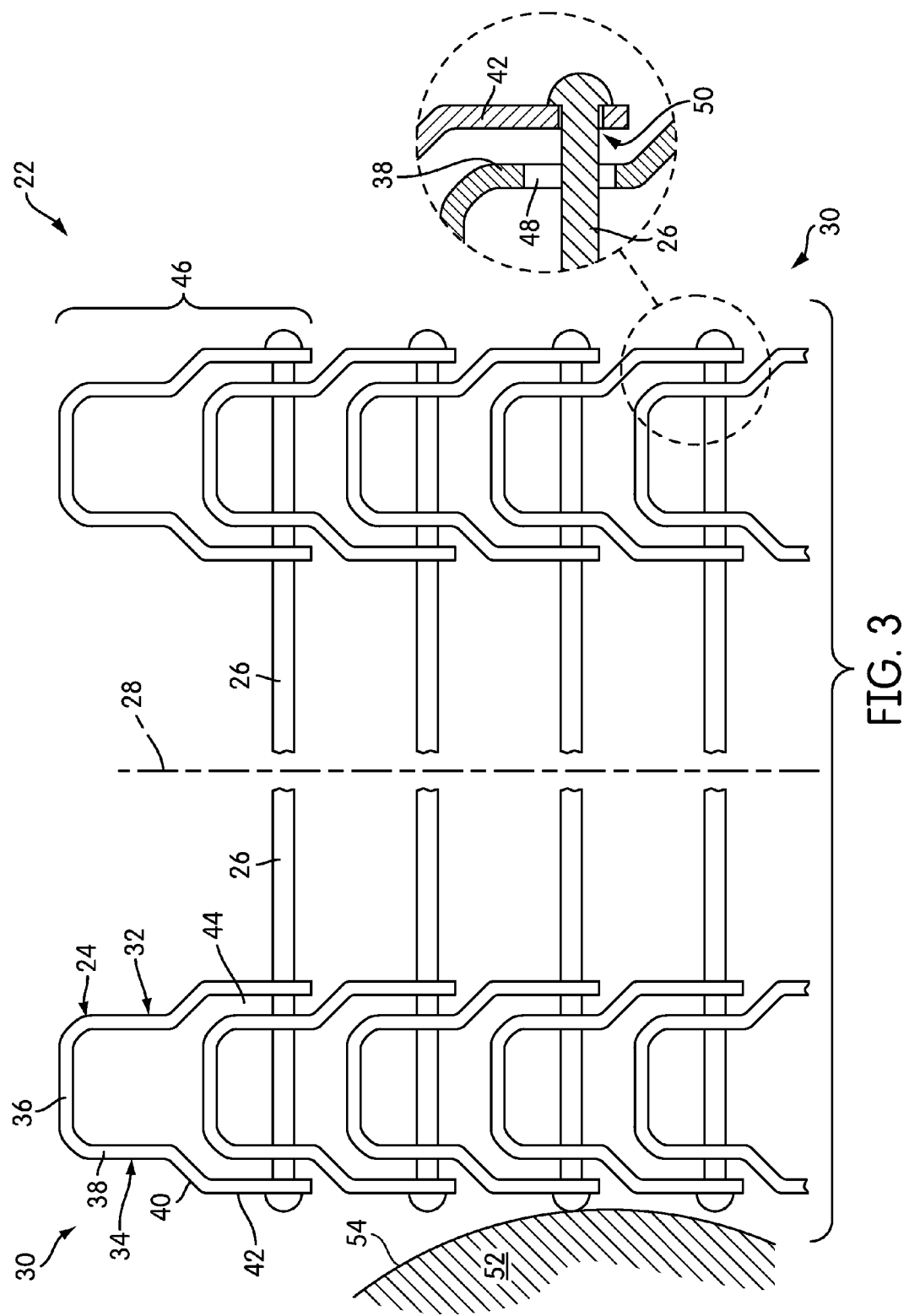
FIG. 3 is an illustration of an exemplary turn-curve conveyor belt.

FIG. 3 shows a top view of an exemplary modular conveyor belt 22. As illustrated in FIG. 3, conveyor belt 22 may include a plurality of links 24 connected by a plurality of elongated rods 26. A center line 28 indicates the approximate midline of conveyor belt 22. Conveyor belt 22 may include outer ends 30. For purposes of this disclosure, the term "outer," as used in this description and the appended claims, shall refer to a direction toward outer ends 30 of conveyor belt 22 and away from center line 28. Conversely, the term "inner" shall refer to a direction toward center line 28 and away from outer ends 30 of conveyor belt 22. In addition, for purposes of this disclosure, the term "longitudinal direction" shall refer to the direction in which center line 28 is oriented.

As shown in FIG. 3, all of rods 26 may be substantially similar in shape and dimension, with each of rods 26 being an elongated cylindrical body formed of an elongated portion of a rod material. In some embodiments, rods 26 may be made from a metal material, such as steel, stainless steel, aluminum, titanium, and/or other metals. In other embodiments, rods 26 may be made from a non-metallic material, such as plastic, wood, carbon fiber, and/or other non-metallic materials. In some embodiments, rod 26 may be a substantially hollow tube or pipe. In other embodiments, rod 26 may be solid.

The inner portions of rods 26 (near center line 28) are truncated in FIG. 3 for purposes of illustration. Rods 26 may be any suitable length for supporting and carrying a variety of wares. In some embodiments, rods 26 may have a uniform or substantially uniform diameter along the length of the cylindrical body. The diameter may be selected based upon factors such as the type of goods being moved on conveyor belt 22, the width of conveyor belt 22, and/or other considerations. In some embodiments, rods 26 may include tapering or stepped configurations.

As shown in FIG. 3, rods 26 may be operatively connected to each other with links 24. In some embodiments, links 24 may be substantially U-shaped, wherein each link 24 is constructed with two legs, including an inner leg 32 and an outer leg 34, joined by a connecting member 36. In some embodiments, inner leg 32 and outer leg 34 may be mirror-image forms. Accordingly, as the configuration of inner leg 32 and outer leg 34 are identical save for opposing orientation, for the sake of clarity, only the structure of outer leg 34 is discussed with particularity. Outer leg 34 may include a relatively straight upper portion 38 connected by an outwardly-tapering transition region 40 to a relatively straight lower portion 42. This configuration creates a wider lower opening 44 to allow for the interconnection of links 24, as connecting member 36 of one link may readily slide into a nesting relationship with lower portion 42 of an adjacent link. In some embodiments, the fitment of one link within another may be a relatively loose fitment, allowing several millimeters of lateral movement between the components. In other embodiments, the fitment may be substantially tighter, leaving only minimal space between the components, and thus, maintaining the links in a consistent alignment when nested.

It will be appreciated that the form of the links joining together elongate rods is not limited to the configurations shown and discussed in the present disclosure. In some embodiments, the configuration of the connective links may be simpler than link 24. For example, in some embodiments, each leg of the link may include a single straight portion. Alternatively, the configuration of the connective link may be more involved for certain applications. For example, embodiments are envisioned wherein the connective links have more bends and/or a more complex shape than link 24. In addition, although inner leg 32 and outer leg 34 are shown in the accompanying drawings as having mirror images of each other to provide symmetry for link 24, in other embodiments, link 24 may be asymmetrical.

Each rod 26 may be fixedly attached to two links 24 (for example by welding), one at each end of the rod, forming a pitch 46. Pitches 46 may be rotatably connected to one another. For example, each rod 26 may pass through openings 48 in upper portions 38 of outer legs 34 and through corresponding openings in inner legs 32. While rods 26 may be fixedly attached to outer leg 34 at or near opening 50 in lower portion 42, rods 26 may be free to rotate within the openings 48 in upper portions 38 and the counterpart openings in inner legs 32.

In some cases, conveyor belts may be configured for a straight path of conveyance. Such belts are often referred to as "straight run" conveyor belts. In other cases, conveyor belts may be configured for turning laterally to the left and/or right. Such belts are often referred to as "turn curve" conveyor belts. In order to navigate curves, modular conveyor belts may be collapsible longitudinally. In some cases, the entire width of the belt may be collapsible longitudinally. In other cases, only one end of the belt may be collapsible, for example, when the belt is only needed to turn in one direction. Belts may be made collapsible by utilizing longitudinally oriented slots instead of circular holes to receive the rods. The structure that enables collapsibility of conveyor belts is discussed in greater detail below.

Conveyor belt 22, as shown in FIG. 3, may be a collapsible type of conveyor belt. That is, the belt pitches may be movable longitudinally with respect to one another. In order to facilitate this longitudinal collapsibility, the openings 48 in upper portions 38 of outer legs 34 and counterpart openings in inner legs 32 may be longitudinally slotted, as shown in FIG. 3, thus allowing for longitudinal translation of a rod of a given pitch 46 within a link of an adjoining pitch.

Conveyor belt 22 may be collapsible at both outer ends 30 or at only one of outer ends 30. Further, in some embodiments, outer ends 30 may be independently collapsible, that is, each end 30 may be collapsible independent of the opposite outer end 30 of conveyor belt 22. This independent collapsibility may enable conveyor belt 22 to be propelled around turns. That is, when being propelled around a turn, the outer end 30 of conveyor belt 22 that is on the inside of the turn may collapse longitudinally, whereas the outer end 30 on the outside of the turn may remain expanded longitudinally. Such a conveyor belt may be referred to as a "turn-curve" conveyor belt.

Conveyor belt 22 may be driven, pulled, propelled, and/or guided by a structure such as a drum 52. Drum 52 may have a drive surface 54, which may contact outer end 30 of conveyor belt 22. In some embodiments, drum 52 may be configured to simply guide conveyor belt 22 along a designated path. That is, a separate drive mechanism may propel conveyor belt 22, and drum 52 may guide conveyor belt 22 along the designated path. In other embodiments, drum 52, in addition to guiding conveyor belt 22, may also be configured to propel conveyor belt 22. Thus, conveyor belt 22 may be configured to contact drive surface 54.

The drive surface of the drum or other such propulsion or guidance device may be configured to engage a conveyor belt. The drive surface may be made of any suitable material for such contact. For example, the drive surface of the drum may be made of rubber, plastic, metal, and other suitable materials. These materials can be hard, abrasive, and/or may carry debris that acts as an abrasive during contact of the drive surface with the contact weld on an outer portion of the conveyor belt.

In some cases, conveyor belts may be flat top belts. Flat top belts are manufactured with a support surface on one face of the links so that the surface abuts an adjacent link, therefore leaving no significant open areas between rows, or pitches.

In some embodiments, the belts may be picket style belts. Picket style belts have transverse links resembling the shape of a square wave mathematical function. The links in picket style belts have laterally aligned rod holes or slots allowing for a connecting rod to be inserted.

In some cases, the pickets or "pitches" of picket style belts may have the formed of an oscillating flat member. Such picket style belts are referred to as "flat wire" style belts. Examples of basic flat wire style conveyor belt structures and manufacturing methods can be found in U.S. Pat. Nos. 4,846,339 and 5,954,188, which are incorporated herein by reference. These structures and methods of manufacturing are generally applicable to the conveyor belt embodiments described herein.

Figure 4:
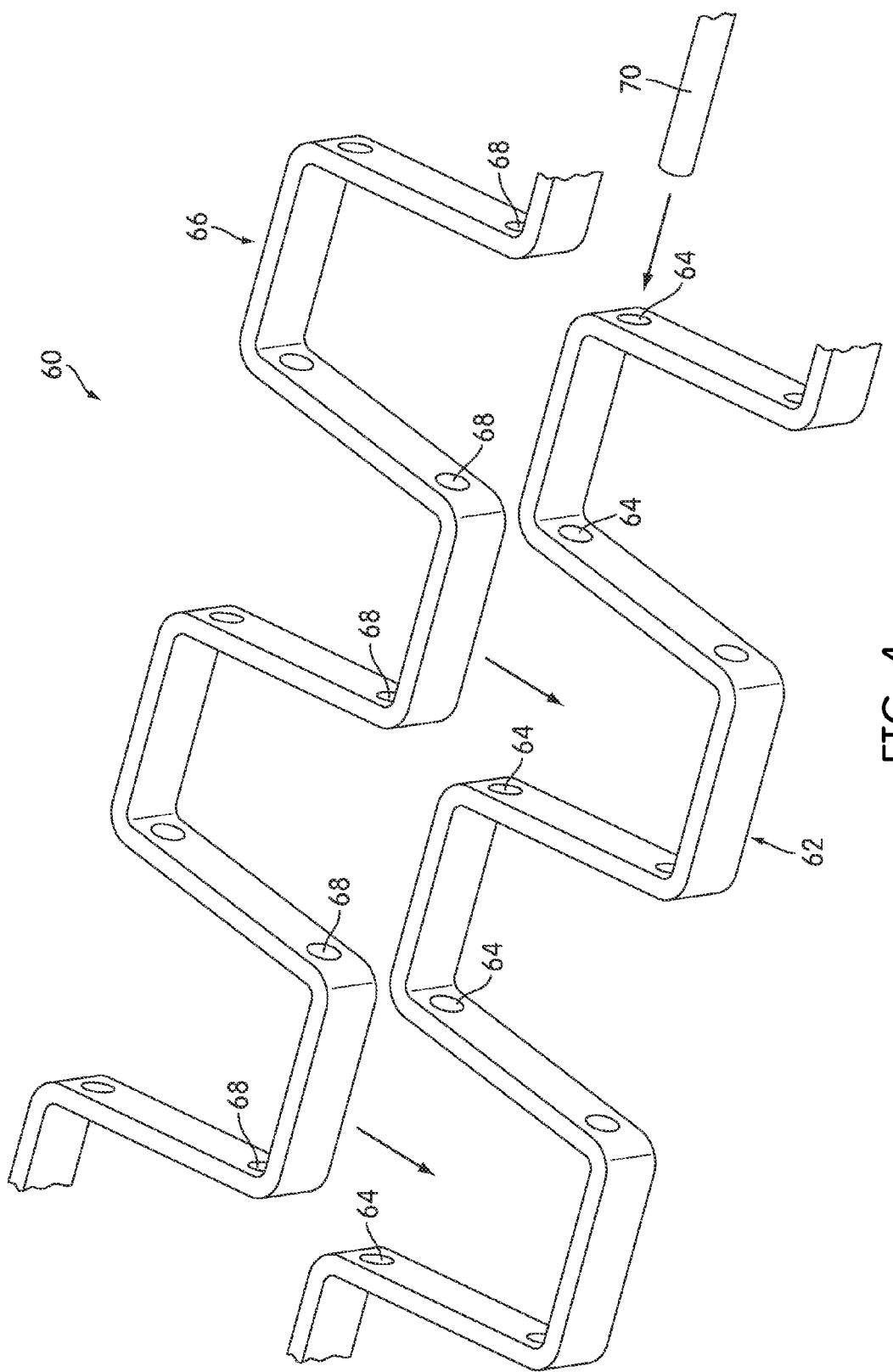
FIG. 4 is a perspective view of an exemplary prior art flat wire conveyor belt.

FIG. 4 is a schematic view of two pitches of a prior art flat wire style conveyor belt 60. As can be seen in FIG. 4, flat wire belt 60 may include a first pitch 62, which may have multiple rod receiving apertures 64. Belt 60 may also include a second pitch 66. Second pitch 66 may also include multiple rod receiving apertures 68. When rod receiving apertures 64 are aligned with rod receiving apertures 68, a substantially straight rod receiving path, configured to receive a connecting rod 70, is formed extending transversely across second pitch 66.

In order to assemble a conveyor belt using first pitch 62 and second pitch 66, first pitch 62 may be positioned adjacent to a second pitch 66. First pitch 62 is then engaged with or interconnected with second pitch 66 so that first pitch rod receiving apertures 64 align with second pitch rod receiving apertures 68 to form a rod receiving path. The rod receiving path enables connecting rod 70 to be pushed through both first pitch rod receiving apertures 64 and second pitch rod receiving apertures 68 to associate first pitch 62 and second pitch 66.

Another type of modular conveyor belt is a finger style belt. Finger style belts may include links that feature a straight or zig-zag central transverse rib from which finger-like protrusions extend in the forward and/or rearward direction. The fingers typically have laterally aligned rod holes or slots allowing for a connection rod to be inserted.

Figure 5:
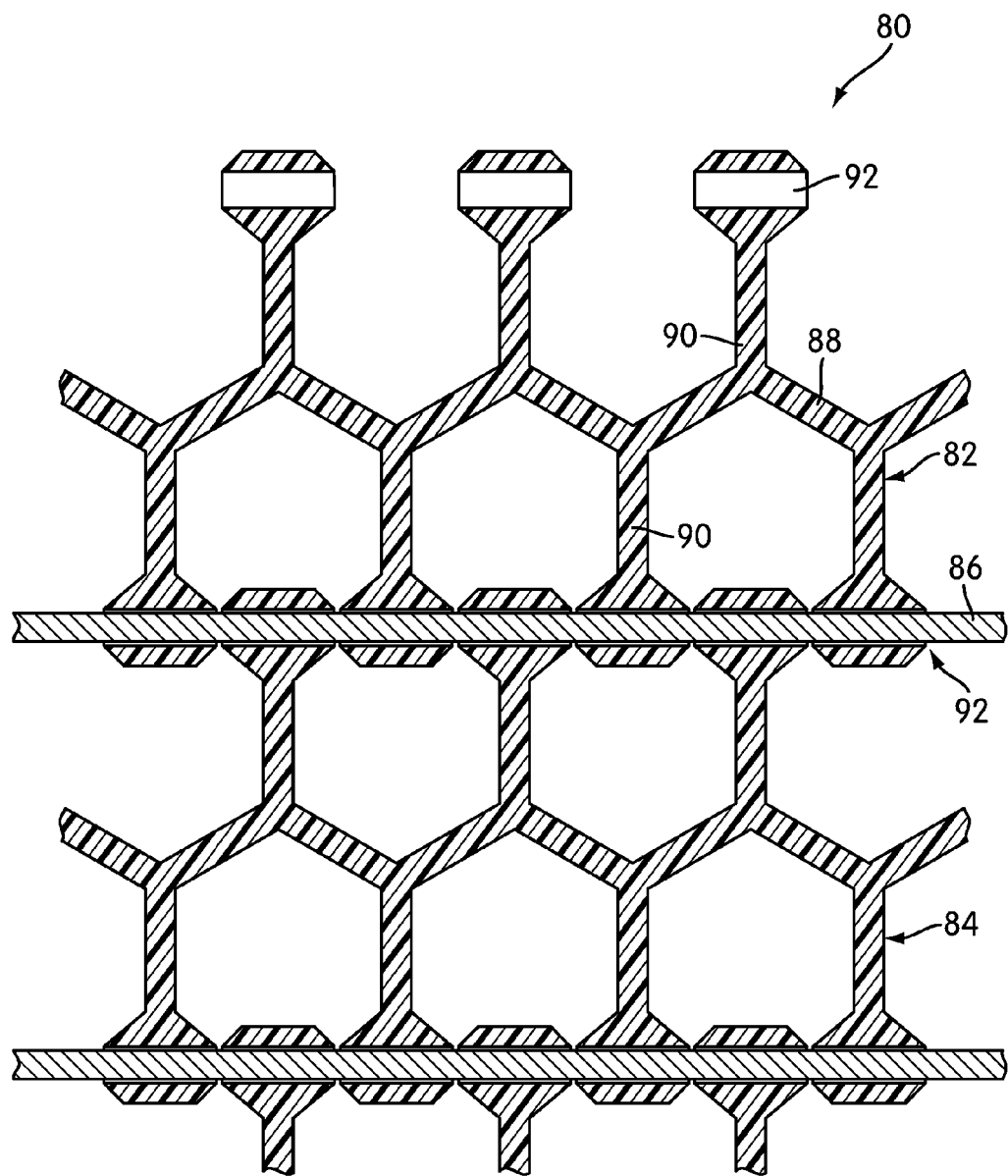
FIG. 5 is a cross-sectional view of an exemplary finger style conveyor belt.

FIG. 5 illustrates an exemplary finger style belt 80. As shown in FIG. 5, belt 80 may include a first pitch 82 hingedly connected to a second pitch 84 via a connecting rod 86. Each pitch of belt 80 may include a zig-zag transverse rib 88. In addition, each pitch may include alternating finger-like protrusions 90, which may include rod receiving apertures 92 configured to receive connecting rod 86.

In some embodiments, links of conveyor belt pitches may include rod retention features configured to prevent undesired removal of connecting rods from assembled conveyor belts. In some embodiments, end links on both right and left lateral edges of the conveyor belt may include rod retaining features. In other embodiments, only selected end links may be provided with rod retaining features. For example, in some embodiments, only right end links or only left end links may be provided with rod retaining features. In some embodiments, all pitches of the belt may have the rod retaining feature on the same edge. In other embodiments, pitches in the belt may alternate as to which edge of the belt, right or left, includes the retention feature. For example, a first pitch may have an end link on the right edge of the belt that includes a rod retention feature, and a second, adjacent pitch may have an end link on the left edge with a rod retention feature, and a third pitch, adjacent the second pitch, may include an end link on the right edge with a rod retention feature, and so on.

In some embodiments, end links may include a retention cage extending laterally from an outer leg of the end link and including retention features. In other embodiments, rod retention features may be incorporated into the outer leg of the end link.

Figure 6:
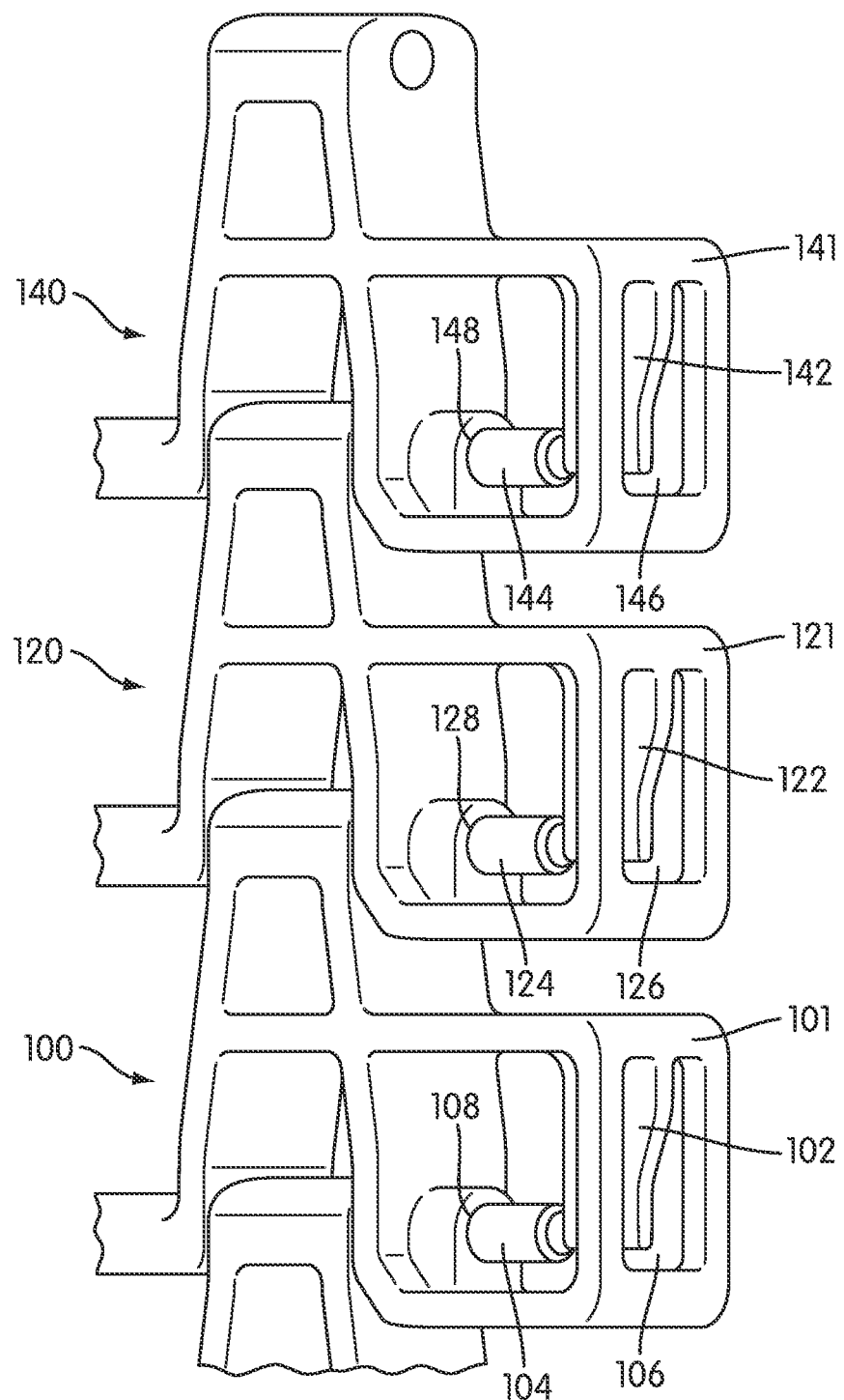
FIG. 6 is a partial perspective view of an embodiment of a modular conveyor belt assembly with a rod retaining feature in each end link.

FIG. 6 is a schematic view of an embodiment of a conveyor belt assembly with a rod retaining feature in a retention cage of each end link shown. As can be seen in FIG. 6, a first end link 100 of a first pitch may be connected to a second end link 120 of a second pitch by a connecting rod 124. Second end link 120 may be connected to a third end link 140 of a third pitch by a connecting rod 144. In the embodiment shown, first end link 100, second end link 120, and third end link 140 may be part of repeated link structures with end links at the terminus of respective pitches.

As can be seen in FIG. 6, a first retention cage 101 may be associated with first end link 100. First end link 100 may include a first slotted opening 106 on the lateral side of first retention cage 101, as shown in FIG. 6. A first flexible projection 102 may extend from a first surface of first slotted opening 106 towards a second surface of first slotted opening 106 near the center of first slotted opening 106. In an undeflected position, first flexible projection 102 may prevent connecting rod 104 from moving laterally, thereby preventing the connecting rod 104 from sliding out of first slotted opening 106. Deflecting first flexible projection 102 laterally may allow connecting rod 104 to be inserted through first slotted opening 106 into a rod receiving aperture 108 in first end link 100. First flexible projection 102 may be a resilient member configured to return to an undeflected position after a deflection force is released.

The deflection of first flexible projection may be performed in any suitable way. For example, in some embodiments, first flexible projection 102 may be configured to be deflected by hand, such as using a finger. Additionally, or alternatively, first flexible projection 102 may be configured to be deflected by using a tool, such as a screwdriver, or a specialty tool developed for such an application, or a connecting rod. Accordingly, first flexible projection 102 may be provided with a flexibility and resilience suitable for the intended manner in which first flexible projection 102 may be deflected. For example, flexible projections may be provided with greater flexibility if they are to be deflected by hand.

In some embodiments, at least a portion of the lateral side of first flexible projection 102 may be disposed within first slotted opening 106, as shown in FIG. 6. For example, at least a portion of the lateral side of first flexible projection 102 may be disposed substantially flush with an outer surface of retention cage 101, as shown in FIG. 6. This flush configuration may facilitate deflection of first flexible projection 102 through first slotted opening 106, for example, by insertion and actuation of a screwdriver. In other embodiments, the laterally outer side of the rod retaining flexible projection may be recessed from the outer surface of the retention cage. Recessed configurations may be utilized if first flexible projection 102 is intended to be accessed from above or below (as opposed to being accessed laterally through an opening in the side of the retention cage. Exemplary recessed configurations are discussed in greater detail below in conjunction with other disclosed embodiments.

As shown in FIG. 6, a second retention cage 121 may be associated with second end link 120. Second retention cage 121 may have a second slotted opening 126 on the lateral side of second retention cage 121. Second end link 120 may also include a second flexible projection 122. Deflecting second flexible projection 122 laterally may allow connecting rod 124 to be inserted through second slotted opening 126 into a rod receiving aperture 128 in second end link 120. Second flexible projection 122 may be a resilient member configured to return to an undeflected position after a deflection force is released. In an undeflected position, second flexible projection 122 may prevent the connecting rod 124 from moving laterally, thereby preventing the connecting rod 124 from sliding out of second slotted opening 126. Accordingly, retention cage 121, second flexible projection 122, and other features of second end link 120 may be substantially similar to those associated with first end link 100.

A third retention cage 141 may be associated with third end link 140. The third retention cage 141 has a third slotted opening 146 on the lateral side of third end link 141. A third flexible projection 142 may be similar to first flexible projection 102 and second flexible projection 122, for which additional details are provided below. Deflecting third flexible projection 142 laterally may allow connecting rod 144 to be inserted through third slotted opening 146 into a rod receiving aperture 148 in third end link 140. Third flexible projection 142 may be a resilient member configured to return to an undeflected position after a deflection force is released. Accordingly, retention cage 141, third flexible projection 142, and other features of third end link 140 may be substantially similar to those associated with first end link 100 and/or second end link 120.

Figure 7:
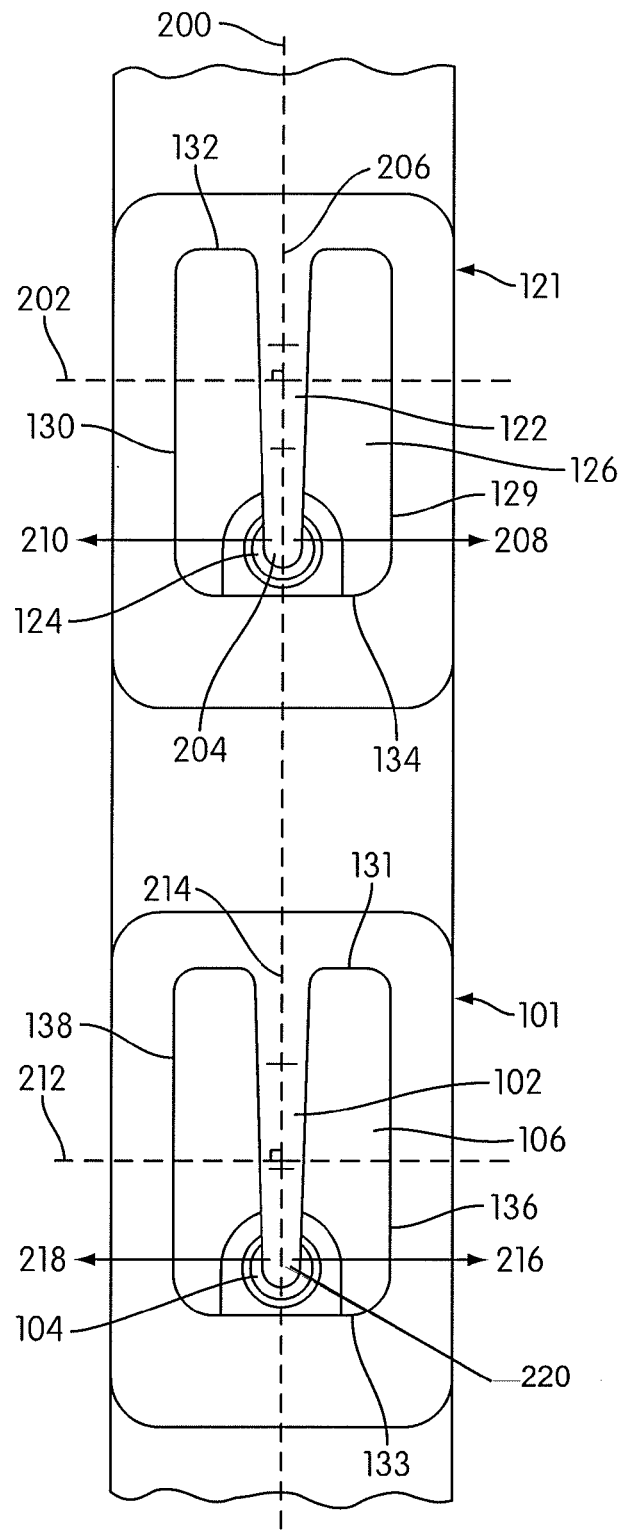
FIG. 7 is a plan side view of the conveyor belt of FIG. 6.

FIG. 7 is a plan side view of the end links of the conveyor belt of FIG. 6. As shown in FIG. 7, first flexible projection 102 may extend substantially along centerline 200 of second slotted opening 126. In addition, first flexible projection 102 may extend substantially along a link centerline 202 and substantially perpendicular to a long axis of connecting rod 104 and a trans-link axis 212.

As also shown in FIG. 7, similar to first flexible projection 102, second flexible projection 122 may extend substantially along centerline 200 of second slotted opening 126. Second flexible projection 122 may also extend substantially along a link centerline 202 and substantially perpendicular to a long axis of connecting rod 124 and a trans-link axis 202.

First flexible projection 102 may be straight or substantially straight in configuration, i.e., with little or no curvature to a long axis of flexible projection 102 when no external forces are applied to flexible projection 102. Flexible projection 102 may be biased so that first flexible projection 102 tends to align with the centerline axis 200 when no force is applied to flexible projection 102.

First slotted opening 106 of retention cage 101 may be defined by a first edge 131, a second edge 133 opposite the first edge 131, a first side edge 136, and a second side edge 138 opposite the first side edge 136. In an undeflected position, a free end 220 of first flexible projection 102 may be located proximate to second edge 133. Free end 220 of flexible projection 102 may be configured to move under applied force in a first direction 216 or a second direction 218, in order to insert or remove connecting rod 104 through first slotted opening 106. As shown in FIG. 7, first direction 216 and second direction 218 may substantially align with trans-link axis 212. In some embodiments, trans-link axis 212 may be substantially perpendicular to the centerline axis 200, as shown in FIG. 7. Free end 220 may move under applied force in either first direction 216 or second direction 218, thereby rotating about a hinge point 214. In some embodiments, hinge point 214 may also be the connection point of first flexible projection 102 with first edge 131, as shown in FIG. 7.

As also shown in FIG. 7, second slotted opening 126 of second retention cage 121 may be defined by a first edge 132, a second edge 134 opposite the first edge 132, a first side edge 129, and a second side edge 130 opposite the first side edge 129. In some embodiments, second flexible projection 122 may extend from first edge 132 towards second edge 134 substantially along centerline 200, as shown in FIG. 7. A second free end 204 of flexible projection 122 may be located proximate to second edge 134.

In some embodiments, as shown in FIG. 7, second flexible projection 122 may be straight or substantially straight in configuration, i.e., with little or no curvature to a long axis of second flexible projection 122, when no external forces are applied to second flexible projection 122. In addition, second flexible projection 122 may be biased so that second flexible projection 122 tends to align with the centerline axis 200 when no force is applied to second flexible projection 122.

Second free end 204 of second flexible projection 122 may be configured to be moved in a first direction 208 or a second direction 210, in order to insert or remove second connecting rod 124 through second slotted opening 126. First direction 208 and second direction 210 may substantially follow the direction of trans-link axis 202. In some embodiments, trans-link axis 202 may be substantially perpendicular to centerline axis 200, as shown in FIG. 7. Second free end 204 may move under applied force in either first direction 208 or second direction 210, thereby rotating about a hinge point 206. In some embodiments, hinge point 206 may also be the connection point of second flexible projection 122 and first edge 132.

Figure 8:
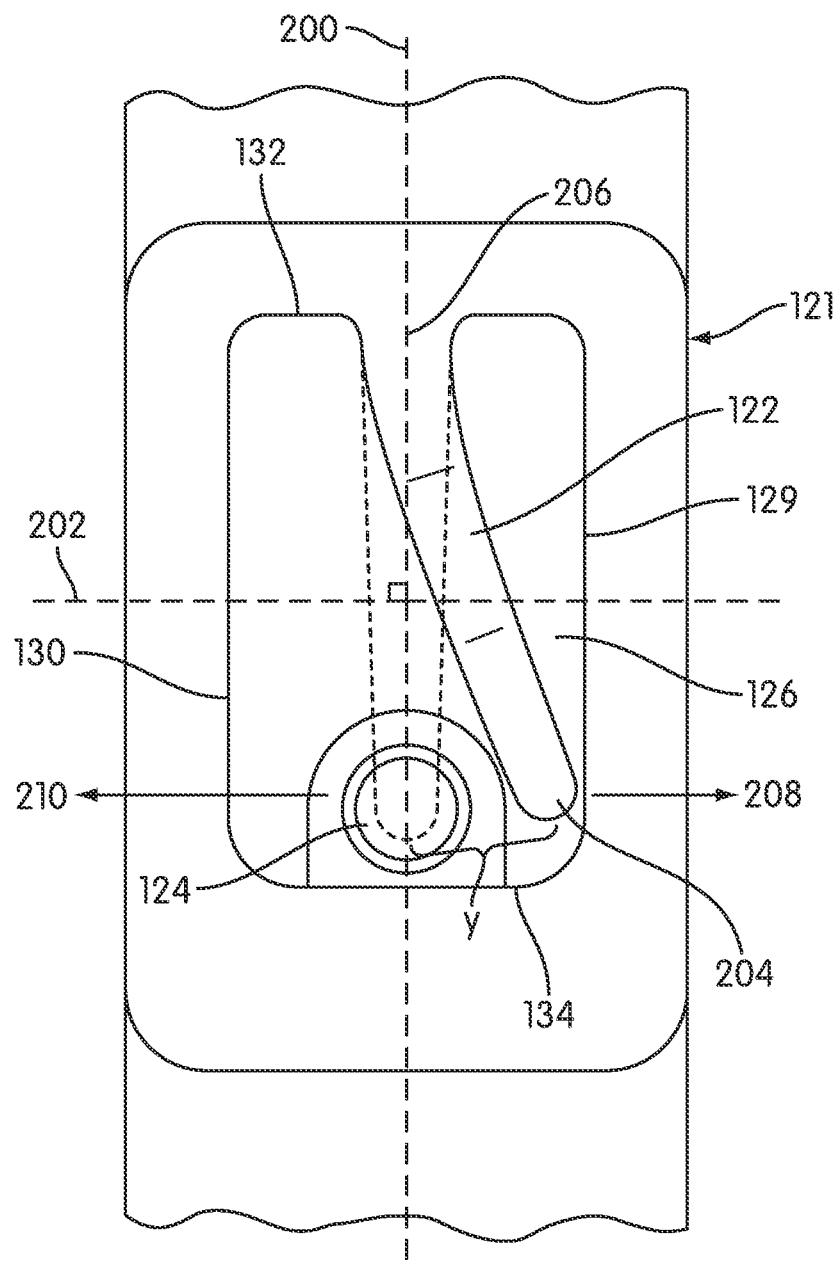
FIG. 8 is an enlarged plan side view of an end link of the conveyor belt in FIG. 6.

FIG. 8 is an enlarged plan side view of second end link 120 from the conveyor belt in FIG. 7. While FIGS. 6 and 7 show each of the flexible projections in an undeflected position, FIG. 8 shows flexible projection 122 in a deflected position. FIG. 8 shows second flexible projection 122 being deflected in first direction 208, and thus rotated about hinge point 206. As shown in FIG. 8, first direction 208 may be perpendicular or substantially perpendicular to the long axis of connection rod 124. In FIG. 8, free end 204 of second flexible projection 122 has been moved a deflection distance y. As illustrated in FIG. 8, deflection distance y is sufficient to allow for second connecting rod 124 to be inserted into and/or withdrawn from second retention cage 121. Although free end 204 of second flexible projection 122 is shown, in FIG. 8, as having been moved in first direction 208 by application of force, free end 204 may also be moved in the second direction 210 at the discretion of the assembler. As will be apparent to those in the art, in some embodiments second flexible projection 122 may assume a curvature along its longitudinal length when the deflection force is applied due to the flexibility of second flexible projection 122. In some embodiments, second flexible projection 122 may be reinforced to inhibit this curvature and to increase the usable life of second flexible projection.

Figure 9:
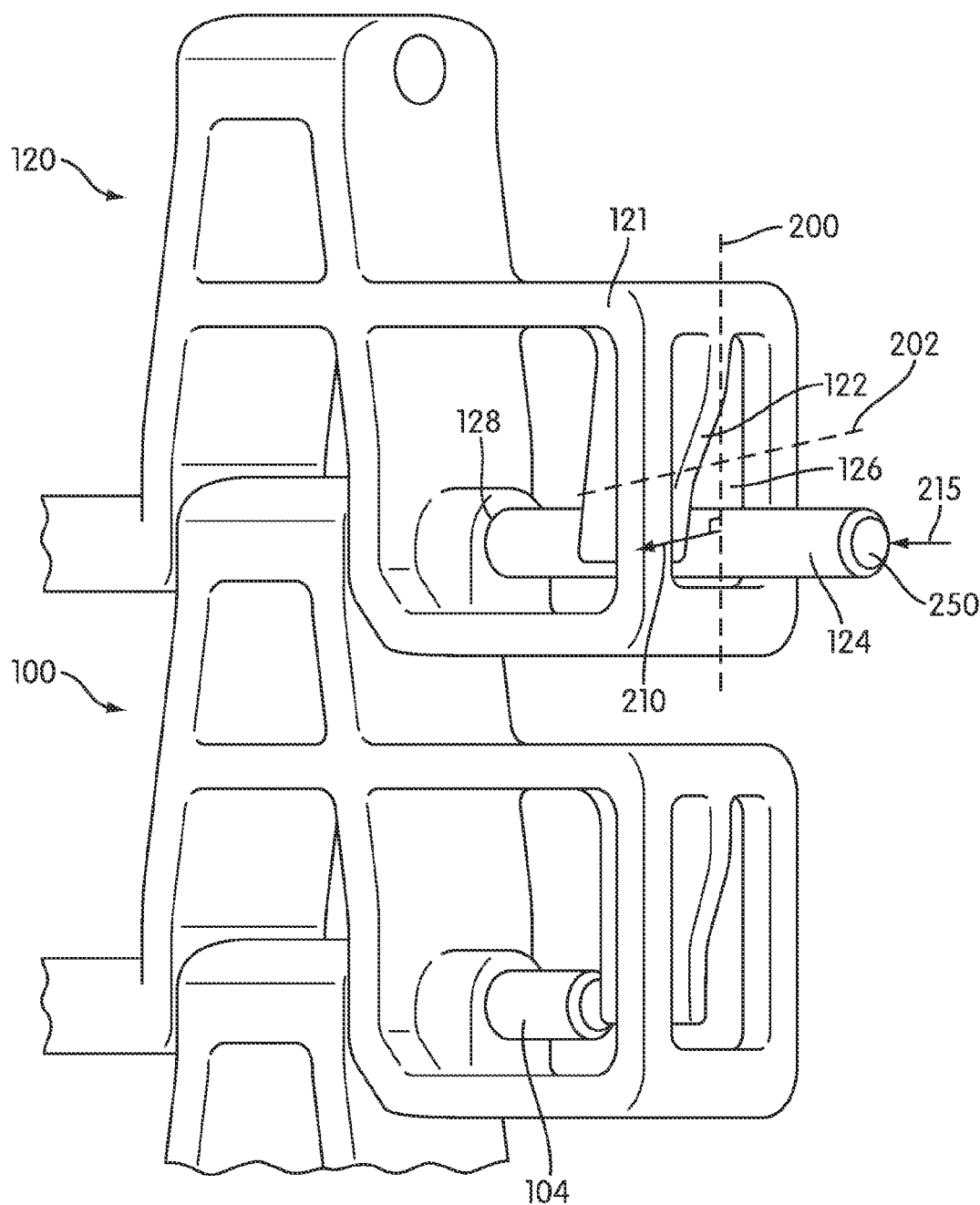
FIG. 9 is an enlarged, partial perspective view of the conveyor belt of FIG. 6 shown during assembly.

FIG. 9 is an enlarged perspective view of the embodiment shown in FIGS. 6-8, wherein connecting rod 124 is only partially inserted. In the configuration shown in FIG. 9, second flexible projection 122 has been deflected in second direction 210, in order to facilitate the insertion of connecting rod 124. Connecting rod 124 may continue to be inserted in an insertion direction 215 so that connecting rod 124 continues insertion into rod receiving aperture 128 in second end link 120 so that connecting rod 124 may be inserted through all of the links of the pitches of first and second end links 100 and 120. Once connecting rod 124 is fully inserted into retention cage 121, and a second end 250 of connecting rod 124 has been inserted into retention cage 121 beyond second flexible projection 122 to assume the completed assembly position shown in second end link 120. After connecting rod 124 has been fully inserted, the deflecting force applied to second flexible projection 122 may then be removed or released so that second flexible projection 122, which is biased to align with centerline axis 200, returns to an undeflected position in which it is aligned with centerline axis 200. Once second flexible projection 122 aligns with centerline axis 200, a portion of second flexible projection 122 may be located between second end 250 of connecting rod 124 and slotted opening 126, thereby preventing connecting rod 124 from being inadvertently removed from retention cage 121. In other words, second flexible projection 122 secures connecting rod 122 within the pitch of end link 120. Thus, second flexible projection 122 may eliminate the need for welding, forming buttonheads, and/or capping the end of connecting rod 124 using additional materials and/or manufacturing steps to secure connecting rod 124 in the desired assembled position.

In some embodiments, one end of the connecting rod 124 may be used to urge second flexible projection 122 to one side. In some embodiments, second flexible projection 122 may be urged to one side using a finger. In some embodiments a standard tool such as a screwdriver, file, or other elongated object sufficiently stiff and strong to move second flexible projection 122 without breaking may be used. In other embodiments, a specially designed tool may be used manually, or in an automated process, to urge second flexible projection 122 to one side. In other embodiments, an automated machine process using a finger-like projection may be used to urge second flexible projection 122 to one side.

End links 100, 120, and 140 (and the pitches in which the end links are formed) may be made using any material known in the art, such as plastic, metal, or composites. For example, various types of materials may be used to manufacture the links and/or rod retaining features. In some embodiments, the links may be manufactured from plastic materials. For example, the links could be made from polypropylene, polyethylene, polyoxymethylene, or polyvinylidene fluoride. In some embodiments, the link may be formed by injection molding. In some embodiments, the link may be manufactured from metal, such as steel.

In some embodiments, the flexible projection may be made of the same material as the link. In other embodiments, the flexible projection may be made from materials having different properties than the rest of the link. For example, the flexible projection may be made of a material that is more resilient than the rest of the conveyor belt. As further example, the flexible projection may be manufactured from some combination of metal and plastic. In some embodiments, the flexible projection may be formed from metal that is coated in plastic in order to increase the durability of the projection. If made from hard or stiff materials, flexible projection may need to be made thinner than other portions of link in order to retain sufficient flexibility to be moved readily to the side by the application of external force. The flexible projection may, in some embodiments, be made from a material capable of withstanding plastic deformation when exposed to the type of force required to move flexible projection. However, a certain amount of elastic deformation may be desirable in some embodiments.

In some embodiments, the flexible projection may be co-formed with the retention cage, or end link. In other embodiments, the flexible projection may be fixedly or removably attached, such as by welding or by applying adhesives or mechanical fasteners such as screws, rivets, or the like, to the end link after the conveyor belt has been manufactured. In some embodiments, the flexible projection may be associated with the retention cage or end link with a hinge. In some embodiments, the hinge may be a co-formed plastic hinge, sometimes referred to as a "living hinge." In some embodiments, the hinge may be capable of holding the flexible projection at any angle to the centerline of the retention cage or link leg until a force is applied, so that the external force need not be constantly applied to hold the retention cage in the deflected position while inserting the connection rod. In other embodiments, the hinge may be lockable into position, such as by using stops or screws.

Connecting rods 124 and 144 may be any type of connecting rod known in the art, such as a solid or hollow elongated member. In addition, connecting rods 124 and 144 may be made of any material known in the art, such as plastic, metal, or composites.

Figure 10:
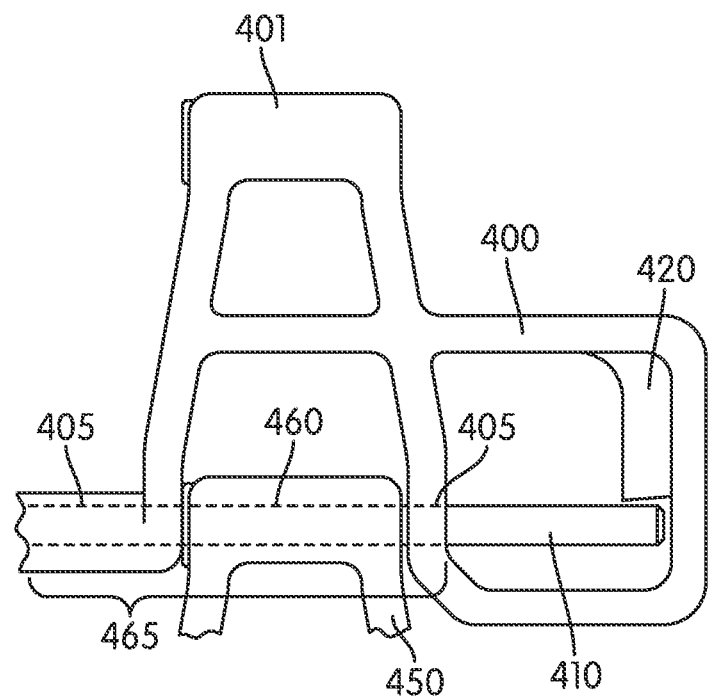
FIG. 10 is a plan view of an embodiment of a conveyor belt end link with including a rod retaining feature.

FIG. 10 is a plan view of an embodiment of a conveyor belt with a rod retaining feature with a slotted opening on the end of the conveyor belt link. As can be seen in FIG. 10, a first end link 401 has a retention cage 400 associated with the lateral side of first end link 401. Retention cage 400 may have a flexible projection 420 extending away from one of the inner edges of retention cage 400. A connecting rod 410 extends through rod receiving apertures 405 in the first end link 401, as well as a rod receiving aperture 460 in a second end link 450. The apertures 405 in the first end link 401 and the aperture 460 in the second end link 450, which form a rod insertion path 465.

Figure 11:
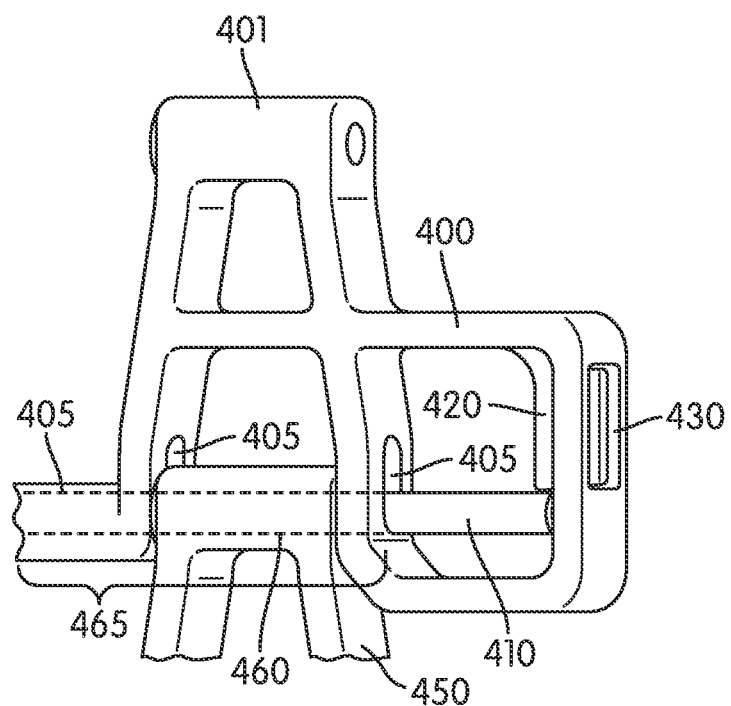
FIG. 11 is a perspective view of the conveyor belt end link shown in FIG. 10.

FIG. 11 is a perspective view of the conveyor belt in FIG. 10. As can be seen in FIG. 11, the flexible projection 420 extends away from one of the inner edges of the retention cage 400. In order to assemble the conveyor belt in FIGS. 5 and 6, the flexible projection 420 is urged to one side so that one end of the connecting rod 410 can be inserted through a slotted opening 430. Flexible projection 420 may be pushed, pulled or otherwise forced to one side of slotted opening 430. In some embodiments, this may be accomplished by using tools. In other embodiments, this may be accomplished manually by using fingers. In other embodiments, this may be accomplished by using the end of a connecting rod.

Once the entire connecting rod 410 has been inserted through the slotted opening 430, connecting rod 410 may continue to be advanced through rod receiving apertures 405 and 460 along rod insertion path 465. Once rod 410 has been fully inserted into rod insertion path 465, the deflecting force may be removed from flexible projection 420 allowing it to return to its biased centerline position. Thus, the flexible projection 420 retains the end of connecting rod 410 in a portion of retention cage 400 in order to keep the connecting rod 410 from slipping out of slotted opening 430 during assembly or operation. In some embodiments, opening 430 may be in the form of an oval, square, rectangle, or any other suitable geometric shapes. Similar embodiments are discussed below, wherein, instead of a slotted opening, such as slotted opening 430, the opening in the retention cage is substantially circular.

As shown in FIG. 11, rod receiving aperture 405 may be slotted. This slotted configuration enables connecting rod 410 to be inserted through slotted opening 430, at least a portion of which is aligned with one end of the slotted aperture 405. Once the trailing end of connecting rod 410 clears the outer wall of retention cage 400, connecting rod 410 may be longitudinally translated to the other end of slotted aperture 405, which is not aligned with slotted opening 430. When connecting rod 410 translates to this position, flexible projection 420 may be allowed to return to an undeflected position, in which flexible projection 420 prevents connecting rod 410 from longitudinally translating back to the first end of the slot, thereby preventing alignment of connecting rod 410 with slotted opening 430. In this manner, flexible projection 420 may prevent the removal of connecting rod 410 through slotted opening 430 unless and until flexible projection 420 is again deflected out of the way. Additional details of this slotted rod receiving aperture configuration are discussed below in conjunction with other embodiments.

As shown in FIG. 11, flexible projection 420 may extend into slotted opening 430. For reasons discussed above, in other embodiments, the lateral edge of flexible projection 420 may be recessed from the laterally outer surface of retention cage 400.

Figure 12:
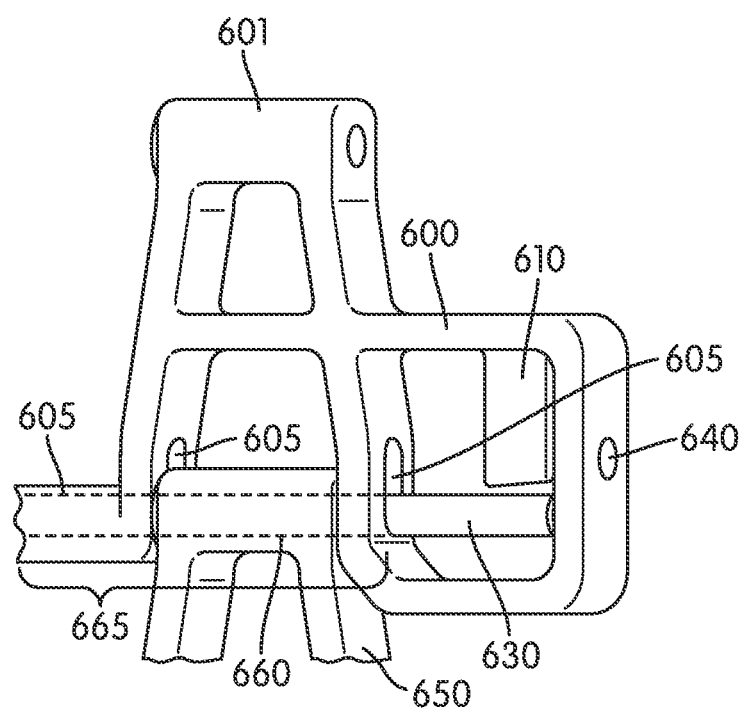
FIG. 12 is a perspective view of another conveyor belt end link embodiment including a rod retaining feature.

FIG. 12 illustrates an alternative modular conveyor belt embodiment including a first end link 601 having a retention cage 600 associated with the lateral side of first end link 601. The retention cage 600 may have a flexible projection 610 extending away from one of the inner edges of retention cage 600. In some embodiments, flexible projection 610 may be spaced some distance from the lateral edge of retention cage 600, and thus, recessed from the laterally outer surface of retention cage 600. A connecting rod 630 may extend through apertures 605 in first end link 601, as well as an aperture 660 in a second end link 650. Apertures 605 in first end link 601 and aperture 660 in second end link 650 form a rod insertion path 665.

As shown in FIG. 12, flexible projection 610 may extend away from one of the inner surfaces of retention cage 600. In order to assemble the conveyor belt shown in FIG. 12, flexible projection 610 may be urged to one side, in the manner described in regard to FIG. 11. With flexible projection 610 deflected to the side, connecting rod 630 may be inserted through a round opening 640 in the lateral side of retention cage 600. Once the entire connecting rod 630 has been inserted through the round opening 640, the deflecting force may be removed from flexible projection 610, allowing it to return to its biased centerline position. Thus, the prong-like projection 610, in the undeflected position, retains one end of connecting rod 630 in a portion of retention cage 600 in order to keep connecting rod 630 from slipping out of round opening 640 during assembly or operation of the conveyor belt. In some embodiments, opening 640 may be in the form of an oval, square, rectangle, or any other geometric shape.

As with the embodiment shown in FIGS. 10 and 11, rod receiving apertures 605 may be slotted, and one end of slotted apertures 605 may be in substantial alignment with opening 640 in retention cage 600. Once connecting rod 630 is fully inserted, connecting rod 630 may be longitudinally translated to the other end of the slotted apertures 605 out of alignment with opening 640. With connecting rod 630 translated to this second end of apertures 605, flexible projection 610 may resiliently return to an undeflected position, wherein it prevents connecting rod 630 from translating back to the first end of slotted apertures 605 into alignment with opening 640. Thus, flexible projection 610 may prevent removal of connecting rod 630 from retention cage 610 through aperture 640.

In addition, as illustrated in FIG. 12, for reasons discussed above, flexible projection 610 may be recessed from the laterally outer surface of retention cage 600. Further, due to the smaller size of round opening 640, a flexible projection may not fit within the opening and still allow a retention rod to be inserted therethrough, even if the projection is deflected to one side. However, in some embodiments, round opening 640 may be significantly larger than the diameter of the connecting rod and, accordingly, could accommodate a flexible projection within the larger opening.

Figure 13:
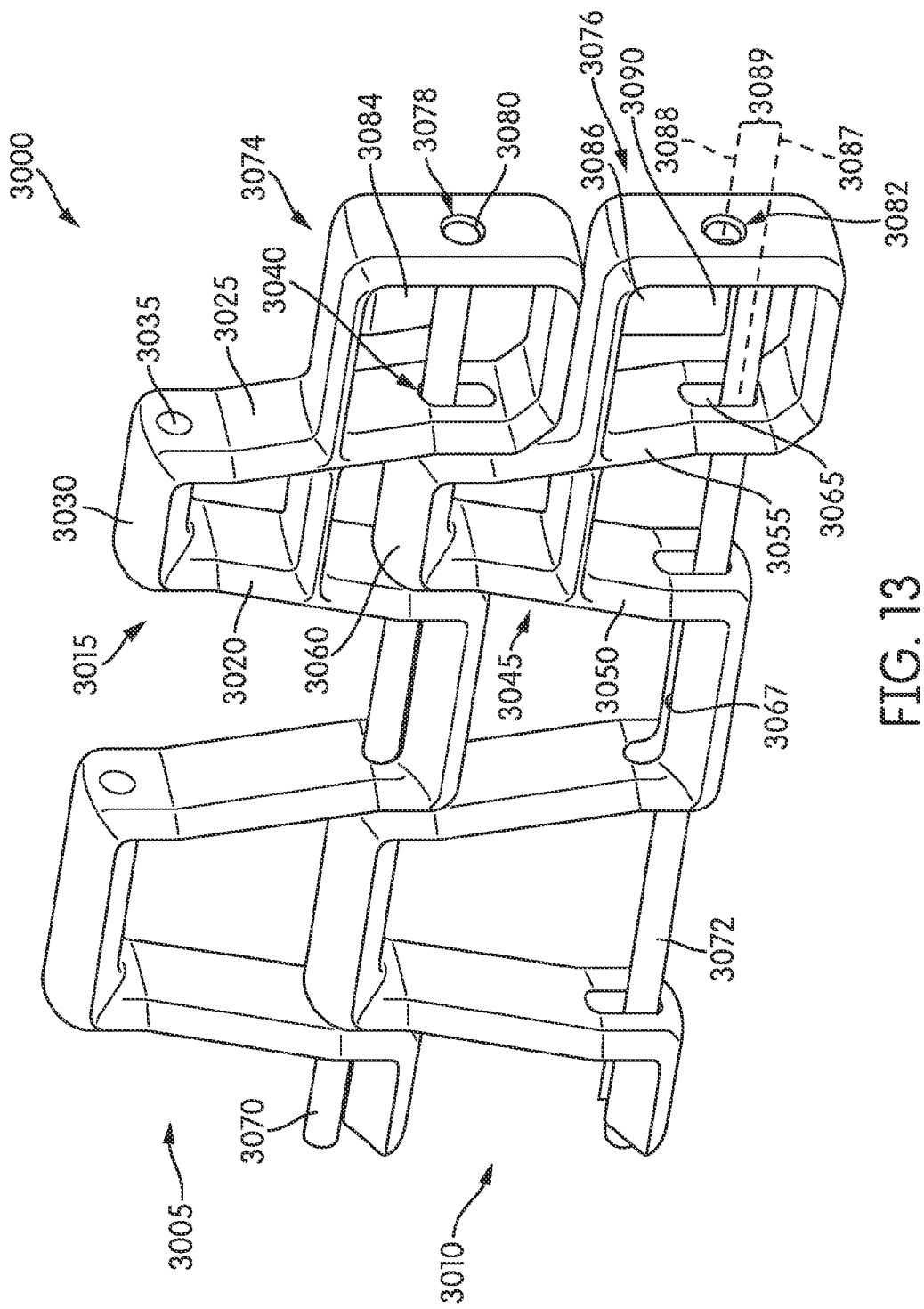
FIG. 13 is a perspective view of another conveyor belt embodiment including a rod retaining feature.

FIG. 13 illustrates a portion of a modular conveyor belt embodiment similar to the embodiment shown in FIG. 12. FIG. 13 illustrates, in more detail, the process for assembling a modular conveyor belt having the illustrated configuration.

As shown in FIG. 13, a modular conveyor belt 3000 may include a first pitch 3005 and a second pitch 3010. First pitch 3005 may include a first end link 3015. In some embodiments, first end link 3015 may be substantially U-shaped. For example, as shown in FIG. 13, first end link 3015 may include an inner leg 3020, an outer leg 3025 and a connecting portion 3030 between inner leg 3020 and outer leg 3025.

First end link 3015 may include a rod receiving aperture 3035 configured to receive a laterally inserted connecting rod. In addition, first end link 3015 may include a first slotted rod receiving aperture 3040 extending laterally through outer leg 3025. That is, rod receiving aperture 3040 may be a longitudinally elongate slot configured to allow a connecting rod received within the slot to be longitudinally translated from one end of the slot to the other.

Second pitch 3010 may include a second end link 3045. In some embodiments, second end link 3045 may be identical or substantially identical to first end link 3015. Accordingly, second end link 3045 may be substantially U-shaped, including an inner leg 3050, an outer leg 3055, and a connecting portion 3060 between inner leg 3050 and outer leg 3055.

Second end link may also include a second slotted rod receiving aperture 3065. Second slotted rod receiving aperture 3065 may be configured to receive a connecting rod in a similar manner as slotted rod receiving aperture 3040. In addition, second pitch 3010 may include a second rod receiving slot 3067. First pitch 3005 may also include a similar or identical first slot, which is hidden behind/under connecting rod 3070 in FIG. 13. Second slotted rod receiving aperture 3065 and second rod receiving slot 3067, together, provide second pitch 3010 with a laterally oriented rod receiving path that is longitudinally elongated.

Conveyor belt 3000 may further include a first connecting rod 3070. As shown in FIG. 13, first connecting rod 3070 may be inserted through first slotted rod receiving aperture 3040 and may connect first pitch 3005 to second pitch 3010. In addition, conveyor belt 3000 may include a second connecting rod 3072 which may be inserted through slotted aperture 3065 and slot 3067 and which may connect second pitch 3010 to a third pitch (not shown).

First pitch 3005 may include a first retention cage 3074 extending laterally from outer leg 3025 of first end link 3015. Likewise, second pitch 3010 may include a second retention cage 3076, extending laterally from outer leg 3055 of second end link 3045.

First retention cage 3074 may include a first opening 3078, through which connecting rod 3070 may be inserted. As shown in FIG. 13, first opening 3078 may be substantially circular and may have a diameter that is approximately the same or slightly larger than the diameter of connecting rod 3070. As discussed above with regard to other embodiments, first opening 3078 may have any suitable shape and/or size. In addition, in order to facilitate initial insertion of a leading end of connecting rod 3070, first opening 3078 may include a chamfer 3080. In some embodiments, the leading end of connecting rod 3070 may include a corresponding bevel (not shown).

Second retention cage 3076 may include a second opening 3082. Second opening 3082 may be substantially similar or identical to first opening 3078 in first retention cage 3074, as shown in FIG. 13.

First retention cage 3074 may also include a first projection 3084, which may be configured to selectively restrict insertion and/or removal of connecting rod 3070. First projection 3084 may be flexible and resilient, as described above with respect to other embodiments. Second retention cage 3076 may include a second projection 3086, which may be substantially similar or identical to first projection 3084.

A first end of each rod receiving slot may be substantially aligned with the opening in the laterally outer side of the retention cage in the pitch, such that, when the resilient projection is deflected into a second position, the opening, the interior of the retention cage, and the first ends of the slots form a rod receiving path. For example, the longitudinally forward end of first slotted aperture 3040 may be substantially aligned with first opening 3078 in first retention cage 3074. This alignment is illustrated in FIG. 13 by the placement of first connecting rod 3070 through this rod receiving path. The insertion of first connecting rod 3070 through this path may be allowed by the deflection of first projection 3084 from a first, undeflected position to a second, deflected position. FIG. 13 illustrates first projection 3084 in a deflected position, permitting first connecting rod 3084 to be inserted through first opening 3084 and the first, longitudinally forward end of first slotted rod receiving aperture 3040.

The pitches may be configured such that, when a connecting rod is inserted along the rod receiving path, and longitudinally translated to a second end of the slot opposite the first end of the slot, and the resilient projection returns to the first position, the projection is positioned to prevent the rod from translating back to the first end of the slot, thereby preventing the removal of the rod through the opening in the laterally outer side of the retention cage. For example, second connecting rod 3072 is illustrated as having been fully inserted through second opening 3082 and longitudinally translated backward to a back end of second slotted rod receiving aperture 3065 and a back end of slot 3067. Accordingly, in this translated position, a long axis 3087 of second connecting rod 3072 may be longitudinally spaced from a central axis 3088 of second opening 3082 by a distance 3089 illustrated in FIG. 13.

When second connecting rod 3072 is moved to this translated position, second projection 3086 may be allowed to return to its undeflected position. Second projection 3086 may be held in the deflected position in any suitable way during the insertion of second connecting rod 3072. In some embodiments, once the leading end of second connecting rod 3072 is inserted into second slotted aperture 3065, second connecting rod 3072 may hold second projection in the deflected position. When second connecting rod 3072 is longitudinally translated beyond a free end 3090 of second projection 3086, second projection 3086 may resiliently return to the undeflected position. In other embodiments, second projection 3086 may be held manually or with a tool in the deflected position while second connecting rod 3072 is being inserted. In such embodiments, the assembling technician may release the deflecting force being applied to second projection 3086 once second connecting rod is moved to the translated position beyond free end 3090 of second projection 3086. In still other embodiments, a detent or catch may be provided in the retention cage, as described in more detail below in regard to another embodiment. In such embodiments, once the connecting rod is moved to the translated position, a return force may be applied to the projection in order to overcome the detent so that the projection may resiliently return to the undeflected position.

Figure 14:
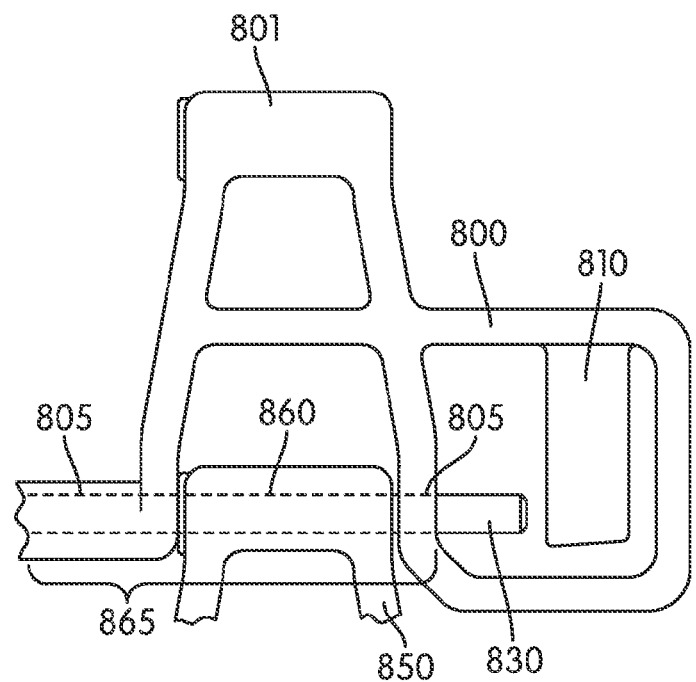
FIG. 14 is a plan view of an embodiment of another conveyor belt end link with a rod retaining feature.

FIG. 14 is a plan view of an embodiment of a conveyor belt with a rod retaining feature spaced some distance from the end of a conveyor belt link with a circular opening in the link. As can be seen in FIG. 14, a first end link 801 may include a retention cage 800 associated with the lateral side of first end link 801. Retention cage 800 may have a flexible projection 810 extending away from one of the inner edges of retention cage 800. In some embodiments, flexible projection 810 may be spaced some distance from the lateral edge of retention cage 800. A connecting rod 830 may extend through apertures 805 in first end link 801, as well as an aperture 860 in a second end link 850. Apertures 805 in first end link 801 and aperture 860 in second end link 850 form a rod insertion path 865. In an undeflected position, the prong-like projection 810 may be disposed between a lateral end of connecting rod 830 and opening 840. Accordingly, in an undeflected position, flexible projection 810 may prevent connecting rod 830 from moving laterally towards the lateral side of retention cage 800.

Figure 15:
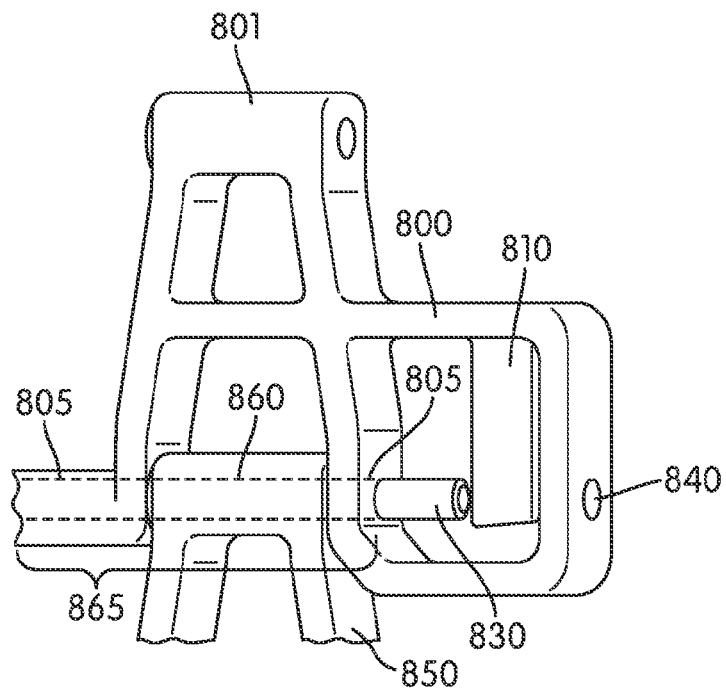
FIG. 15 is a perspective view of the conveyor belt end link shown in FIG. 14.

FIG. 15 is a perspective view of the conveyor belt in FIG. 14. As can be seen in FIG. 15, flexible projection 810 extends away from one of the inner surfaces of retention cage 800. In order to assemble the conveyor belt in FIGS. 9 and 10, the flexible projection 810 is urged to one side, as described above with respect to FIG. 11, so that the connecting rod 830 can be inserted through the round opening 840 in the lateral side of the retention cage 800. Once the entire connecting rod 830 has been inserted through the round opening 840, the connecting rod 830, the force may be removed from flexible projection 810 allowing it to return to its biased centerline position. Thus, the prong-like projection 810 retains one end of connecting rod 830 in a portion of retention cage 800, in order to keep connecting rod 830 from moving laterally and slipping out of round opening 840 during assembly or operation of the conveyor belt. In some embodiments, the opening 840 may be in the form of an oval, square, rectangle, or any other geometric shape.

Figure 16:
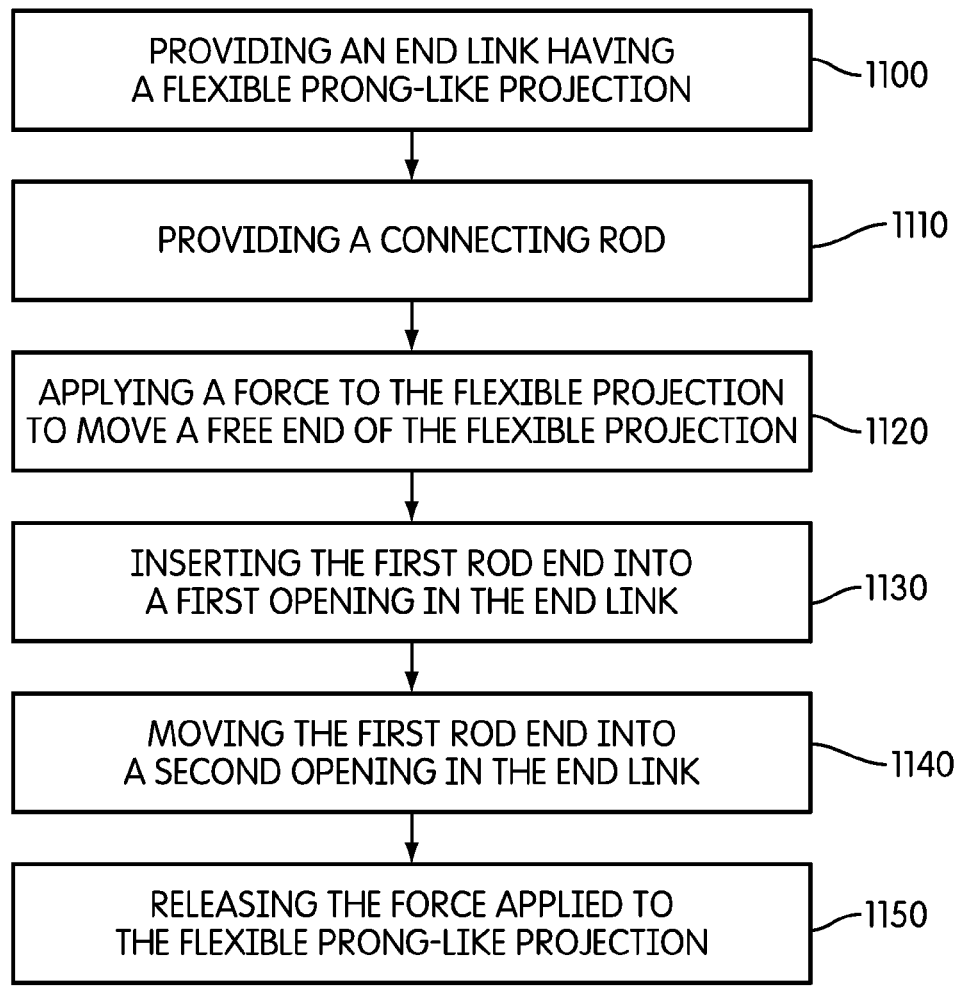
FIG. 16 is a flowchart illustrating a method for assembling a conveyor belt having rod retaining features.

FIG. 16 is an embodiment of a method for assembling a conveyor belt. In some embodiments, the method may include the step of providing an end link having a flexible projection 1100. For example, the end link having a flexible projection may be any of the end link designs discussed in, or incorporated into, this application, such as a prong-like projection. In some embodiments, the end link may have a retention cage associated with a lateral side of the end link, wherein the retention cage has a flexible projection. In some embodiments, the end link or retention cage may have a first opening and a second opening opposite of the first opening.

In some embodiments, the method may further include the step of providing a connecting rod 1110. In some embodiments, the method may further include the step of applying force to the flexible projection in order to move a free end of the flexible projection 1120. In some embodiments, the method may further include the step of inserting an end of the rod into a first opening in the end link 1130. In some embodiments, the method may further include the step of inserting an end of the rod into a second opening in the end link 1140. In some embodiments, the method may further include the step of releasing the force applied to the flexible projection 1150 allowing the flexible projection to return to its biased position, thereby preventing an end of the rod from passing through the first opening.

Some modular conveyor belt embodiments may include features configured to facilitate holding a projection out of the way during insertion of a connecting rod to connect two pitches. For example, in some embodiments, a detent may be provided to hold the projection out of the way. In some embodiments, a retention cage may include a projection, such as a resilient tab or flap configured to deflect out of the way in order to insert a connecting rod, and may resiliently return to an undeflected position to prevent removal of the connecting rod. In order to facilitate insertion of the connecting rod, a detent, such as a protuberance disposed on an inner wall of the retention cage may be configured to restrict the deflection of the tab. For example, the protuberance may be formed as a substantial wedge shape extending from an interior surface of the retention cage, wherein the tab, when deflected, may be retained by the surface of the wedge facing generally away from the undeflected position of the projection.

Figure 17:
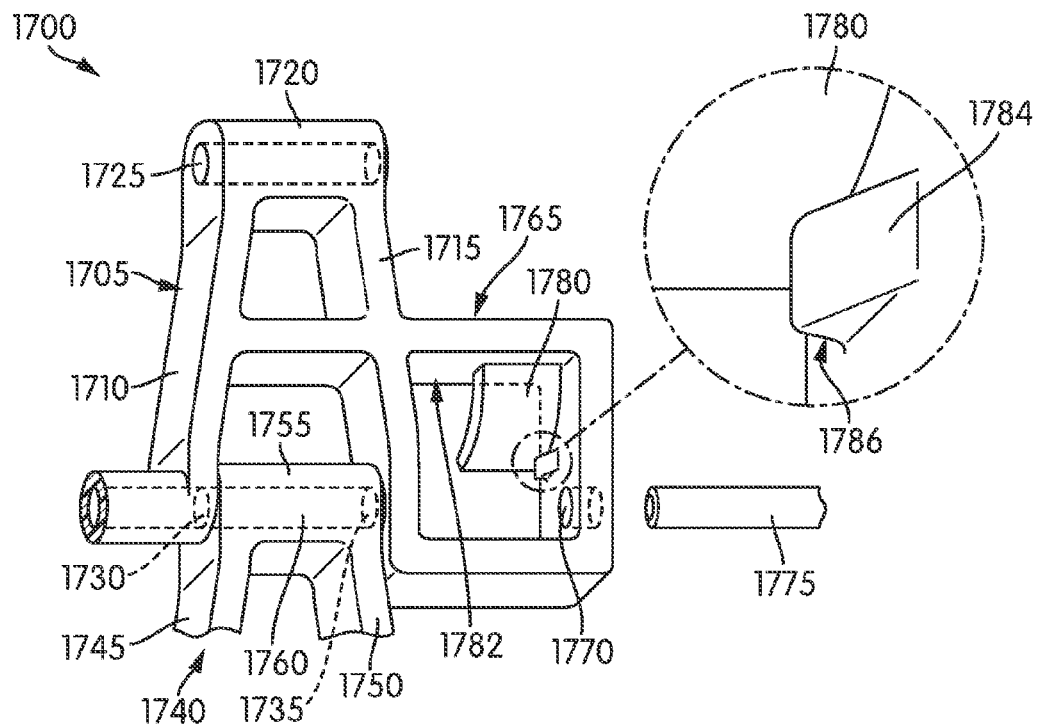
FIG. 17 is a perspective view of another conveyor belt embodiment including a rod retaining feature, showing the rod retaining feature in a deflected position.

FIG. 17 illustrates a portion of a modular conveyor belt embodiment including a detent feature for holding a projection in a deflected position to facilitate insertion of a connecting rod. As shown in FIG. 17, a modular conveyor belt 1700 may include a first pitch having a first end link 1705. In some embodiments, as shown in FIG. 17, first end link 1705 may be substantially U-shaped. For example, first end link 1705 may include an inner leg 1710, an outer leg 1715, and a connecting portion 1720 between inner leg 1710 and outer leg 1715.

First end link 1705 may also include a first rod receiving aperture 1725. In some embodiments, first rod receiving aperture 1725 may include a single bore through connecting portion 1720. In other embodiments, first end link 1705 may include a pair of rod receiving apertures through inner leg 1710 and outer leg 1715 located longitudinally rearward of connecting portion 1720. (See, e.g., FIG. 4.)

In addition to first rod receiving aperture 1725, first end link 1705 may also include a second rod receiving aperture 1730 extending through inner leg 1710, as well as a third rod receiving aperture 1735 extending through outer leg 1715. Second rod receiving aperture 1730 and third rod receiving aperture 1735 may be substantially aligned, each forming a portion of a rod receiving path.

Conveyor belt 1700 may include a second pitch, which may include a second end link 1740. In some embodiments, second end link 1740 may have a substantially similar or identical configuration to first end link 1705. For example, as shown in FIG. 17, second end link 1740 may be substantially U-shaped, including an inner leg 1745, an outer leg 1750, and a connecting portion 1755. In addition, second end link 1740 may include a second end link aperture 1760 extending through connecting portion 1755. In order to connect the first pitch to the second pitch of conveyor belt 1700, second end link 1740 may be brought into a nesting position between inner leg 1710 and outer leg 1715 of first end link 1705, such that second end link aperture 1760 is aligned with second rod receiving aperture 1730 and third rod receiving aperture 1735 of first end link 1705 forming a rod receiving path, and a connecting rod may be inserted into the rod receiving path, to hingedly connect first end link 1705 to second end link 1740.

In order to retain a connecting rod within the rod receiving path during use, conveyor belt 1700 may include one or more rod retaining features. In some embodiments, these rod retaining features may be incorporated into a retention cage 1765, which may extend from outer leg 1715 of first end link

1705. Retention cage 1765 may include an opening 1770 aligned with second rod retaining aperture 1730 and third rod retaining aperture 1735 and may be configured to receive a connecting rod 1775 suitable for insertion through second rod retaining aperture 1730 and third rod retaining aperture 1735.

Retention cage 1765 may include a projection 1780 extending from an internal wall 1782 of retention cage 1765. In some embodiments, projection 1780 may extend in a direction that is substantially perpendicular to a long axis of an inserted connecting rod. Since connecting rod 1775 may be inserted substantially laterally through rod receiving apertures 1730, 1735, and 1760, and opening 1770, in some embodiments, projection 1780 may extend in a substantially longitudinal direction (that is, the direction of travel of the conveyor belt, including forward and rearward conveyance, as explained above).

In some embodiments, the retention cage may include a detent configured to retain the projection in the second, deflected position, while a connecting rod is inserted or removed through the opening. For example, the detent may include a protuberance extending from at least one side of the retention cage and configured to interfere with the deflection of the resilient projection.

As shown in FIG. 17, projection 1780 may be deflected, from a first, undeflected position, to a second, deflected position, in order to allow connecting rod 1775 to be inserted through opening 1770, aperture 1735, aperture 1760, and aperture 1730. Projection 1780 is shown in the deflected position in FIG. 17. In order to hold projection 1780 in the deflected position, retention cage 1765 may include a detent 1784. Detent 1784 may have any shape and form suitable for releasably retaining projection 1780 in the deflected position. For example, as shown in FIG. 17, in some embodiments, detent 1784 may be a substantially wedge-shaped protuberance extending from an interior wall of retention cage 1765. As further shown in FIG. 17, projection 1780, when deflected, may be retained by a surface 1786 of detent 1784 facing generally away from the undeflected position of the projection. Thus, surface 1786 of detent 1784 may be disposed far enough away from the centerline of retention cage 1765 that connecting rod 1775 may be inserted when projection 1780 is retained by surface 1786.

In other embodiments, detent 1784 may have other shapes and forms. For example, some embodiments may include a detent having the form of a protuberance situated similarly to detent 1784, and having a substantially hemispherical or conical shape. Detent 1784 may also have any suitable size to interact with projection 1780 to retain projection 1780 in the deflected position, but also allow moderate pressure to dislodge projection 1780 from detent 1784 to allow projection 1780 to return to the undeflected position.

As illustrated in FIG. 17, in some embodiments, projection 1780 may be substantially centered vertically on interior wall 1782 of retention cage 1765. In addition, projection 1780 may be disposed proximate to the outer portion of retention cage 1765 in order to interact with detent 1784.

It should be noted that a detent similar to detent 1784 may be incorporated into other embodiments disclosed herein. In some embodiments, the configuration of the opening in the retention cage or in the leg of the end link may dictate that the detent be disposed in a different location than that shown in FIG. 17. Those having ordinary skill in the art will recognize suitable locations, shapes, and sizes for such detents.

Some modular conveyor belt embodiments may include retention features configured to prevent removal of connecting rods by friction. For example, in some embodiments, a projection may have a free end that is configured to rest against a circumferential surface of an inserted connecting rod. The free end of the projection and/or the mating surface of the connecting rod may include features that provide increased friction, such as texture or a rubberized surface or coating.

Figure 18:
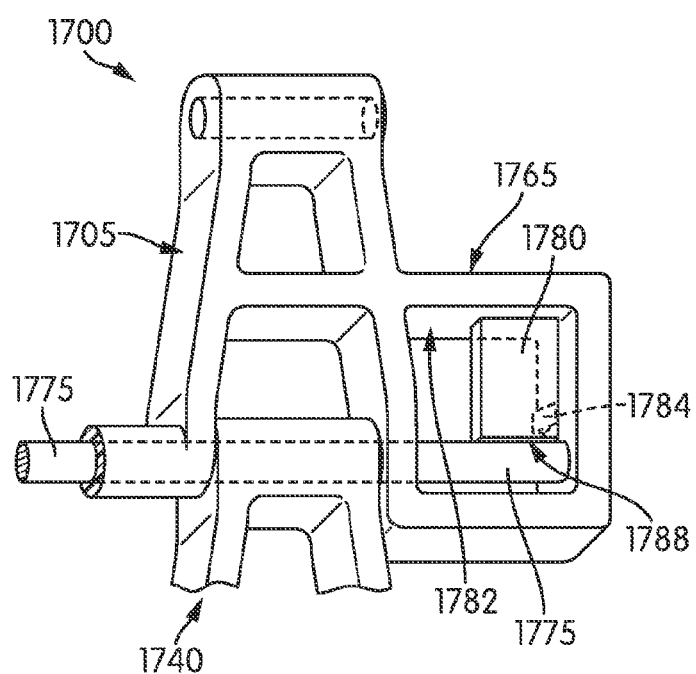
FIG. 18 is a perspective view of the conveyor belt embodiment in FIG. 17, showing the rod retaining feature in an undeflected position.

FIG. 18 illustrates the embodiment of FIG. 17 with projection 1780 shown in the undeflected position. Once connecting rod 1775 is fully inserted, projection 1780 may be released from detent 1784 so that it may resiliently return to the undeflected position shown in FIG. 18. In this undeflected position, a free end 1788 of projection 1780 may contact a portion of the circumferential surface of connecting rod 1775. The frictional contact between projection 1780 and connecting rod 1775 may prevent connecting rod 1775 from being removed.

In some embodiments, free end 1788 and/or the circumferential surface of connecting rod 1775 may include a frictional feature. In some embodiments, the frictional feature may include, for example, a textured surface and/or a rubberized coating on a terminal portion of the rod. In some embodiments, the frictional feature may be included on free end 1788 of projection 1780, and may include a textured surface and/or a rubberized tip portion.

In some embodiments, instead of retention features being disposed in a retention cage extending from an outer leg of an end link, the retention features may be incorporated into the outer leg itself. For example, an end link may have a first leg, including an opening and a projection disposed in the opening. When the projection is in the first position, the projection may prevent a connecting rod from being passed through the opening. In addition, the projection may be configured to deflect a deflection distance that is sufficient to permit a connecting rod to pass through the opening.

Figure 19:
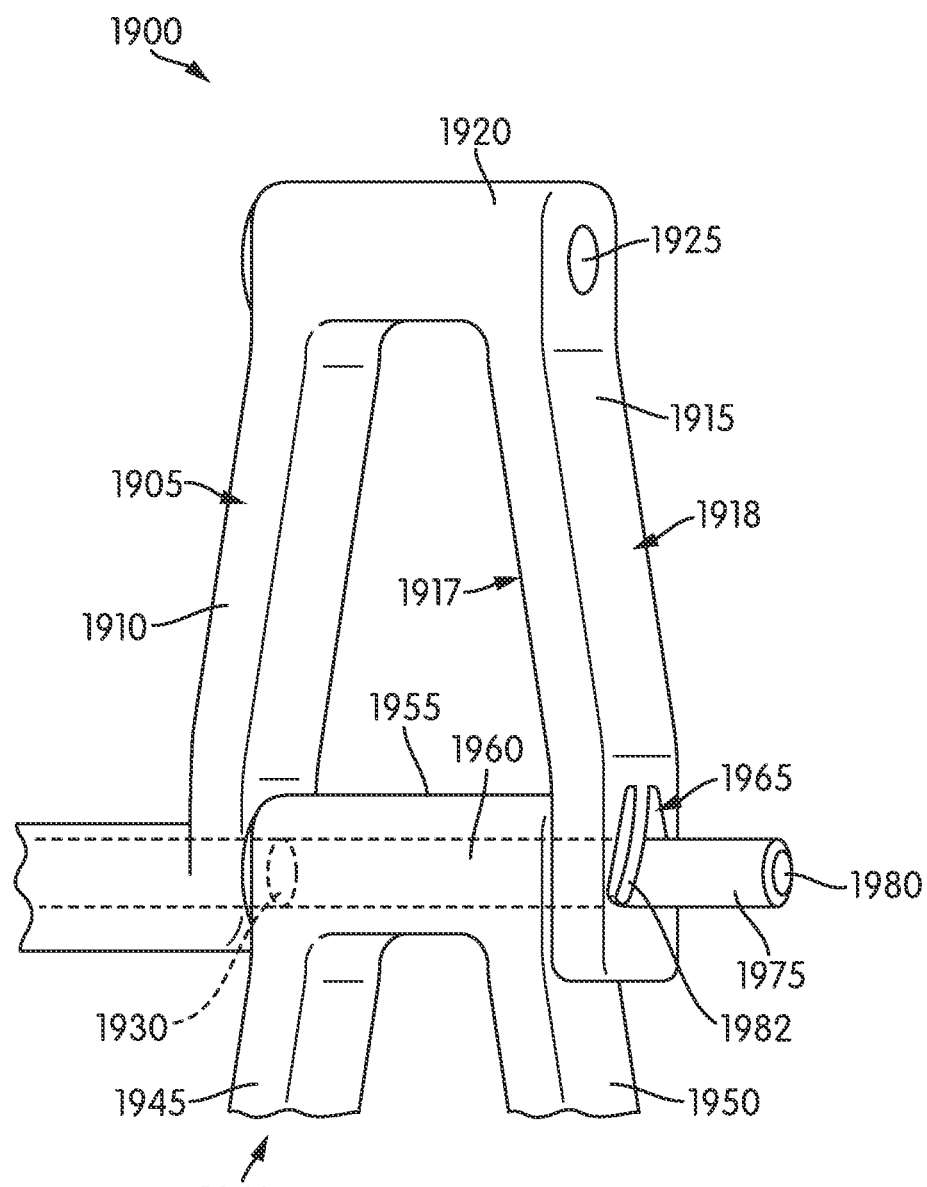
FIG. 19 is a perspective view of another conveyor belt embodiment including a rod retaining feature.

FIG. 19 illustrates a portion of an exemplary modular conveyor belt embodiment including a retention feature incorporated into an outer leg of an end link. For example, FIG. 19 shows a modular conveyor belt 1900 including a first end link 1905. In some embodiments, end link 1905 may be substantially U-shaped. For example, as shown in FIG. 19, end link 1905 may include an inner leg 1910, an outer leg 1915, and a connecting portion 1920 between inner leg 1910 and outer leg 1915. Outer leg 1915 may include an inner surface 1917 and an outer surface 1918, and may comprise a lateral terminus of conveyor belt 1900.

First end link 1905 may include a first rod receiving aperture 1925 extending through connecting portion 1920. In addition, first end link 1905 may include a second rod receiving aperture 1930 extending through inner leg 1910. End link 1905 may also include a third rod receiving aperture 1965 extending through outer leg 1915.

Conveyor belt 1900 may further include a second end link 1940. Second end link 1940 may be substantially similar or identical to first end link 1905. Accordingly, second end link 1940 may include an inner leg 1945, an outer leg 1950, and a connecting portion 1955. Second end link 1940 may also include a second end link rod receiving aperture 1960. In some embodiments, conveyor belt 1900 may be a turn-curve conveyor belt. In such embodiments, rod receiving apertures 1925 and 1960 may be longitudinally elongated slots in order to render conveyor belt 1900 collapsible. Other embodiments described in the present disclosure may also be rendered collapsible in a similar manner.

A connecting rod 1975, having a leading end (not shown) and a trailing end 1980, may be inserted through apertures 1930, 1960, and 1965 in order to connect first end link 1905 to second end link 1940. First end link 1905 may include a projection 1982 configured to prevent removal of connecting rod 1975 once fully inserted. Projection 1982 may be moved to a first, deflected position. An exemplary deflected position is illustrated in FIG. 19. Alternatively, projection 1982 may be deflected in the opposite direction, as shown in FIG. 20.

Figure 20:
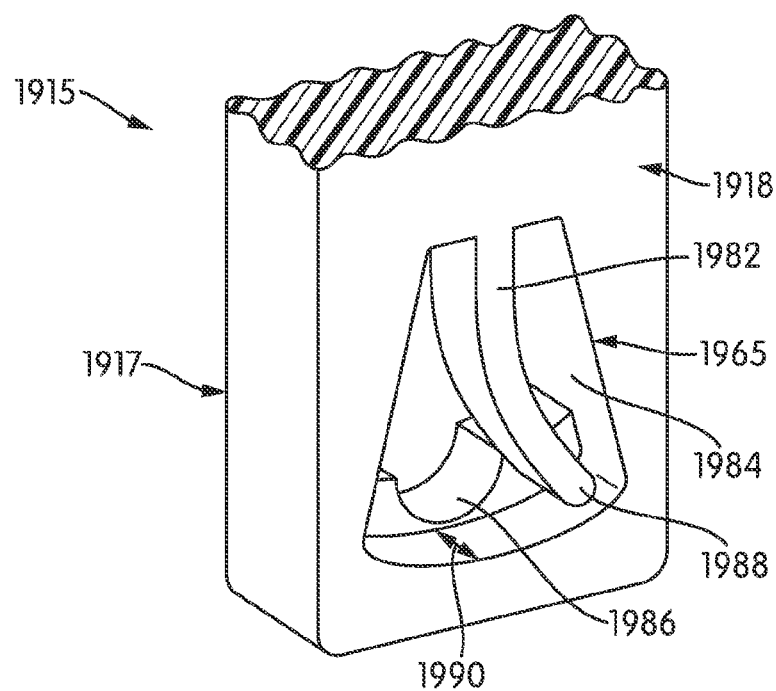
FIG. 20 is an enlarged, perspective view of an outer side of the conveyor belt embodiment of FIG. 19.
Figure 21:
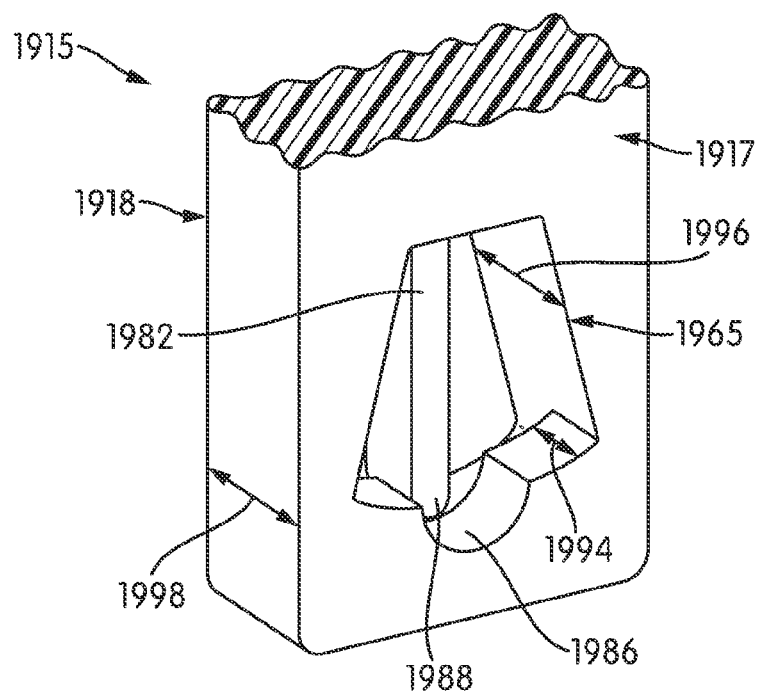
FIG. 21 is an enlarged, perspective view of an inner side of the conveyor belt embodiment of FIG. 19.

FIGS. 20 and 21 are enlarged, perspective views of a portion of first end link 1905 including third rod receiving aperture 1965. FIG. 20 illustrates details of aperture 1965 as viewed from a lateral perspective facing outer surface 1918 of outer leg 1915 of first end link 1905. As shown in FIG. 20, aperture 1965 may include a first side wall surface 1984 and a second side wall surface 1985. FIG. 20 illustrates projection 1982 deflected, such that a free end 1988 of projection 1982 is deflected toward first side wall 1984. In some embodiments, the shape of aperture 1965 may be substantially trapezoidal. In some embodiments, a portion of aperture 1965 may be curved, providing aperture 1965 with a truncated baseball diamond-like shape. A third side wall surface 1992 may be of shortened width, whereas the opposite end of aperture 1965 may be widened in order to accommodate the deflection of projection 1982. In addition, the curvature of aperture 1965 may accommodate the arced path of projection 1982 during deflection. Persons of ordinary skill in the art will recognize, however, that alternative aperture shapes may be utilized. For example, the general shape of aperture 1965 could be substantially square, rectangular, oval, circular, or any other suitable shape.

An inner portion of aperture 1965 may include a rod support portion 1986. Rod support portion 1986 may be a semi-cylindrical recess configured to cradle connecting rod 1975 during and after insertion. Once connecting rod 1975 is fully inserted beyond projection 1982, trailing end 1980 may rest within rod support portion 1986. Rod support portion 1986 may be disposed in a forward facing manner, such that as end link 1905 is pulled around the conveyance path, the conveying forces may be transmitted to connecting rod 1975 through rod support portion 1986. A first dimension 1990 illustrates that rod support portion 1986 may be less than the full lateral thickness of outer leg 1915.

FIG. 21 illustrates details of aperture 1965 as viewed from a lateral perspective facing inner surface 1917 of outer leg 1915. In addition, FIG. 21 shows projection 1982 in the undeflected position. In this undeflected position, projection 1982 may be located laterally of rod support portion 1986 in order to prevent connecting rod 1975 from being removed. A second dimension 1994 illustrates the thickness of rod support portion 1986. First dimension 1990 and second dimension 1994 may, together, span the full thickness of aperture 1965, which is illustrated by a third dimension 1996. In some embodiments, first dimension 1990 and second dimension 1994 may each be substantially half of the thickness 1996 of aperture 1965. In other embodiments, first dimension 1990 may be larger or smaller than second dimension 1994. In addition, in some embodiments, thickness 1996 of aperture 1965 may be equivalent to the full thickness of outer leg 1915, illustrated by a fourth dimension 1998.

Figure 22:
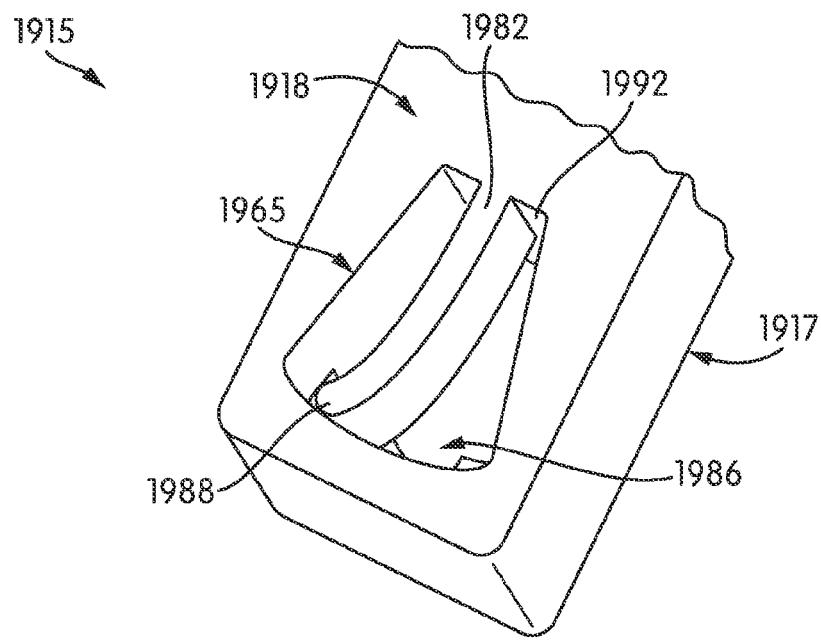
FIG. 22 is another enlarged, perspective view of the outer side of the conveyor belt embodiment of FIG. 19.
Figure 23:
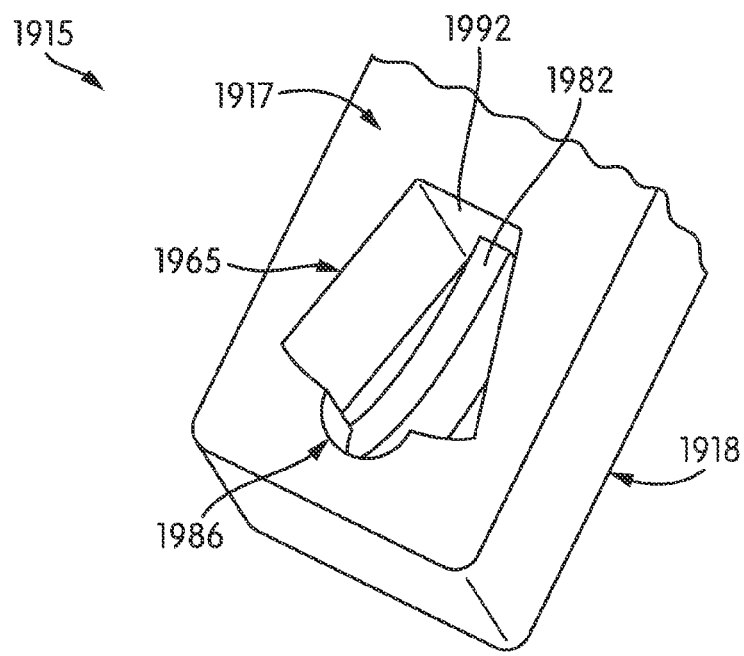
FIG. 23 is another enlarged, perspective view of the inner side of the conveyor belt embodiment of FIG. 19.

FIGS. 22 and 23 provide different perspective views of the outer and inner sides of outer leg 1915. FIGS. 22 and 23 provide details of the junction between projection 1982 and outer leg 1915, showing third side wall surface 1992 and the attachment of projection 1982 to it. It should be noted that projection 1982 is shown as being deflected in opposite directions in FIGS. 22 and 23 and, accordingly, FIGS. 22 and 23, although corresponding back and side views of the same embodiment, do not show the same configuration of this embodiment.

In some embodiments, projection 1982 may be integrally formed (e.g., molded) with outer leg 1915 of end link 1905. In other embodiments, projection 1982 may be a separate piece that is attached by any suitable method, such as welding, adhesive, fasteners, or any other suitable method. In some embodiments, projection 1982 may be formed of a different material than the rest of outer leg 1915. In such embodiments, projection 1982 may be co-molded with other portions of outer leg 1915, or may be attached to outer leg 1915 using one of the methods mentioned above. Projection 1982 may be formed of a flexible and resilient material having characteristics described above with regard to other disclosed embodiments.

The features of aperture 1965 and projection 1982 may be formed by any suitable method. For example, these features may be formed by machining, molding, or any other suitable formation method.

In some cases, it may be desirable to incorporate rod retention features into the outer legs of end links, without using a projection. In some configurations, the size of the outer leg of an end link may be somewhat smaller, and thus, in order to provide a projection incorporated into the outer leg, the projection may be undesirably small. Accordingly, in some embodiments, other types of rod retention features may be incorporated into an outer leg of an end link. For example, rod retention features that do not include a projection like the substantially planar tabs shown in other embodiments of the present disclosure. Instead, in some embodiments, the free end of the outer leg of the end link may include a slit extending laterally through the outer leg and also extending longitudinally a predetermined distance from the free end of the outer leg.

Figure 24:
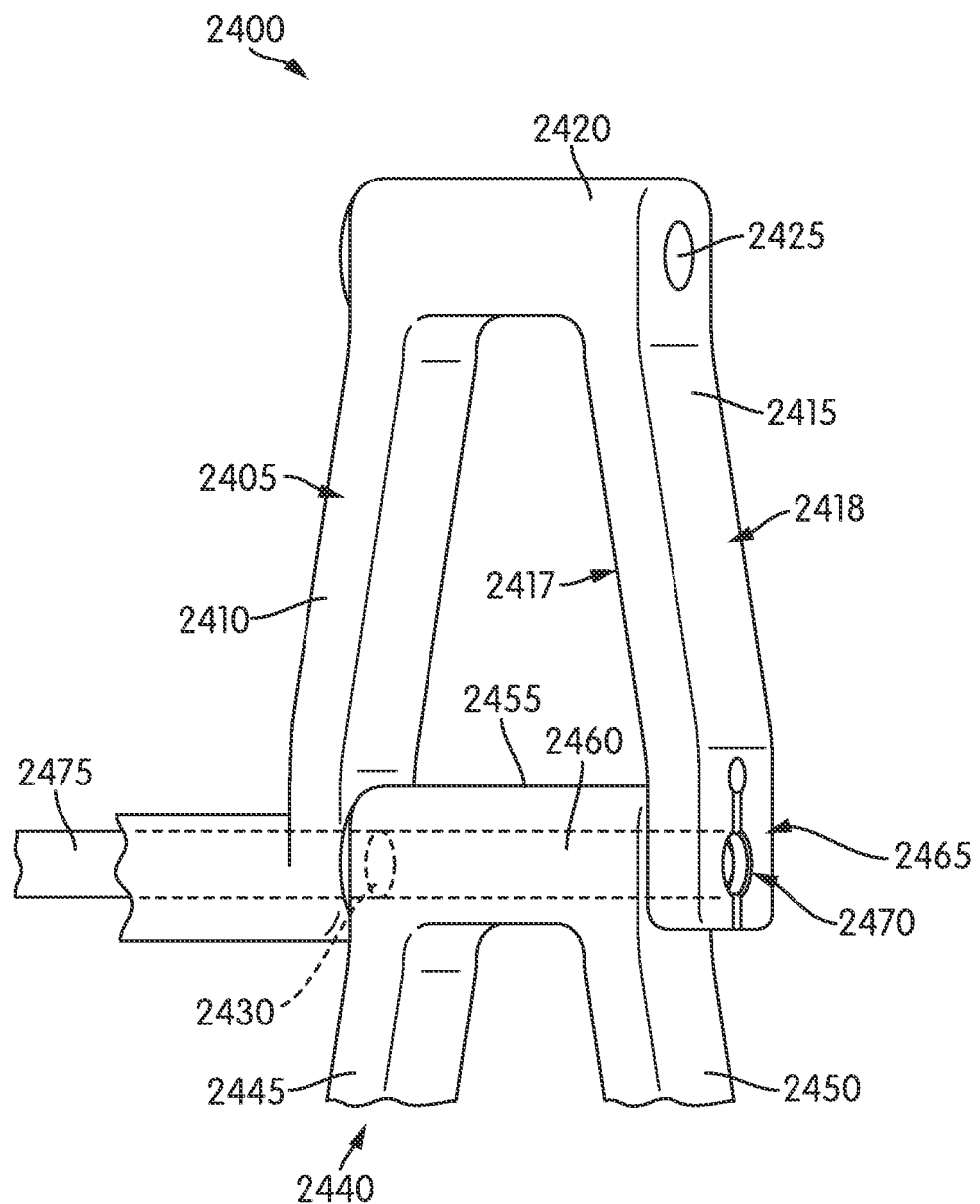
FIG. 24 is a perspective view of another conveyor belt embodiment including a rod retaining feature.

FIG. 24 illustrates a portion of another exemplary modular conveyor belt embodiment including a retention feature incorporated into an outer leg of an end link. FIG. 24 shows a modular conveyor belt 2400 including a first end link 2405. In some embodiments, end link 2405 may be substantially U-shaped. For example, as shown in FIG. 24, end link 2405 may include an inner leg 2410, an outer leg 2415, and a connecting portion 2420 between inner leg 2410 and outer leg 2415. Outer leg 2415 may include an inner surface 2417 and an outer surface 2418, and may comprise a lateral terminus of conveyor belt 2400.

First end link 2405 may include a first rod receiving aperture 2425 extending through connecting portion 2420. In addition, first end link 2405 may include a second rod receiving aperture 2430 extending through inner leg 2410. End link 2405 may also include a rod retaining feature 2465, which may be disposed near a free end of outer leg 2415.

Conveyor belt 2400 may further include a second end link 2440. Second end link 2440 may be substantially similar or identical to first end link 2405. Accordingly, second end link 2440 may include an inner leg 2445, an outer leg 2450, and a connecting portion 2455. Second end link 2440 may also include a second end link rod receiving aperture 2460. In some embodiments, conveyor belt 2400 may be a turn-curve conveyor belt. In such embodiments, rod receiving apertures 2425 and 2460 may be longitudinally elongated slots in order to render conveyor belt 2400 collapsible.

Figure 25:
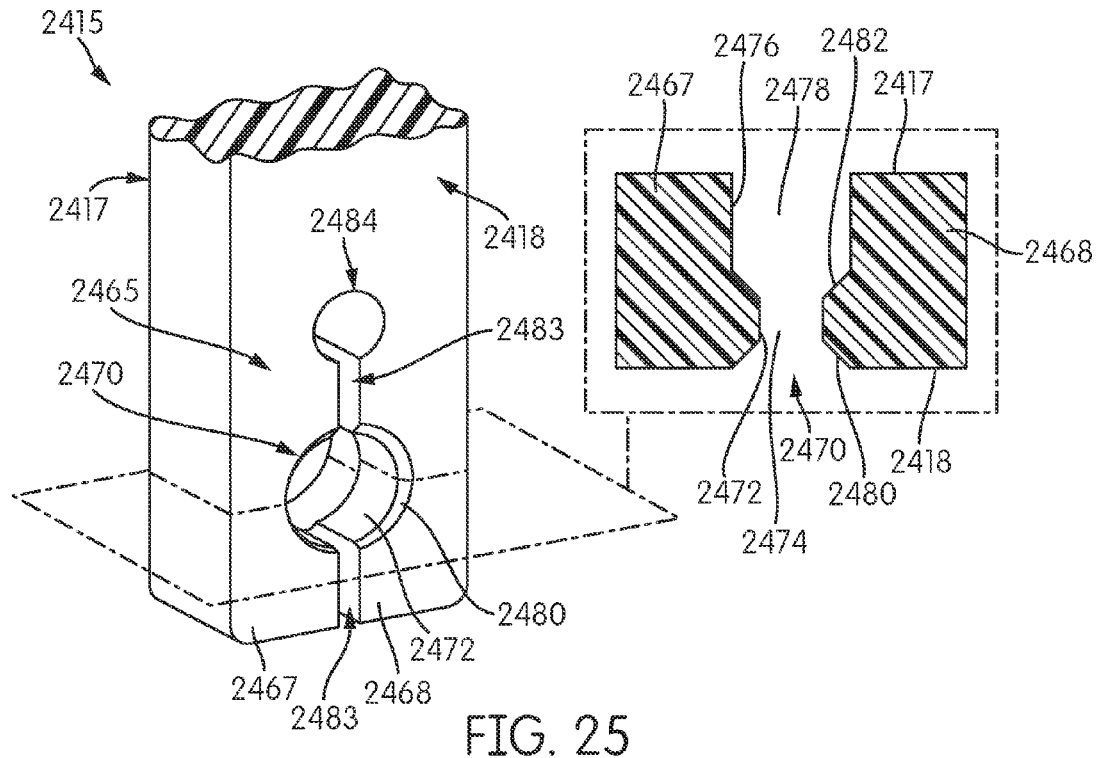
FIG. 25 is an enlarged, perspective and cross-sectional view of an outer side of the conveyor belt embodiment of FIG. 24.

FIG. 25 is an enlarged, perspective and cross-sectional view of an outer side of the conveyor belt embodiment of FIG. 24. As shown in FIG. 25, rod retaining feature 2465 may include an opening 2470 extending through outer leg 2415 in a lateral direction and configured to receive a connecting rod 2475. In addition, rod retaining feature 2465 may also include a slit 2483 extending from a free end of outer leg 2415 in a longitudinal direction at least to opening 2470. In some embodiments, slit 2483 may extend longitudinally beyond opening 2470, as shown in FIG. 25.

Slit 2483 may divide the free end of outer leg 2415 into a first section 2467 and a second section 2468. Slit 2483 may have any suitable dimensions that allow first section 2467 and second section 2468 to be deflected away from each other when a connecting rod having a diameter larger than the narrowest portion of opening 2470 is inserted into opening 2470. In some embodiments, opposing surfaces of first section 2467 and second section 2468 may be in contact with one another. In such embodiments, slit 2483 may simply be a discontinuity in the material. In other embodiments, slit 2483 may provide a slight separation between opposing surfaces of first section 2467 and second section 2468. Such a slight separation may be provided, for example, by the thickness of a cutting device, such as a blade, laser, or other type of cutting device. In other embodiments, a larger separation may be provided, which may facilitate flexibility of first section 2467 and second section 2468. This larger separation may be provided by molding, machining, or other types of shaping methods.

Opening 2470 may have a stepped configuration, including portions with different diameters. A transition between portions with differing diameters may form a shoulder, which may prevent removal of the connecting rod once fully inserted beyond the shoulder. As shown in FIG. 25, opening 2470 may include an outer portion 2472 having a first diameter, forming a first passageway 2474. In addition, opening 2470 may include an inner portion 2476 having a second, smaller diameter, forming a second passageway 2478. The transition between outer portion 2472 and inner portion 2476 may form a shoulder 2482. Shoulder 2482 may be configured to prevent retraction of connecting rod 2475 once inserted substantially through opening 2470. In some embodiments, shoulder 2482 may be chamfered, as shown in FIG. 25. This chamfer may be configured to mate with a corresponding bevel on a trailing end of connecting rod 2475. In other embodiments, shoulder 2482 may be substantially squared off. Both chamfered and squared off shoulder configurations may be used with connecting rods having any suitable shape, including beveled, squared off, rounded, and other shapes.

Connecting rod 2475 may have a diameter that is larger than the first diameter of outer portion 2472 of opening 2470. Thus, as will be explained in more detail below, the larger diameter connecting rod 2475 may expand/separate first section 2467 and second section 2468 of outer leg 2415 when being inserted. In order to facilitate the initial insertion of the leading end of connecting rod 2475, opening 2470 may include a chamfer 2480. In addition, the leading end of connecting rod 2470 may include a corresponding bevel to also facilitate insertion.

Rod retention feature 2465 may include features configured to prevent splitting of outer leg 2415 when first section 2467 and second section 2468 are deflected apart during insertion of connecting rod 2475. First, as noted above, slit 2483 may extend from the free end of outer let 2415 beyond opening 2470. This may relieve stress at the edge of opening 2470. In addition, retention feature 2465 may also include a second opening 2484 at a terminal end of slit 2483, which may provide further stress reduction. Second opening 2484 may extend laterally through outer leg 2415.

Figure 26:
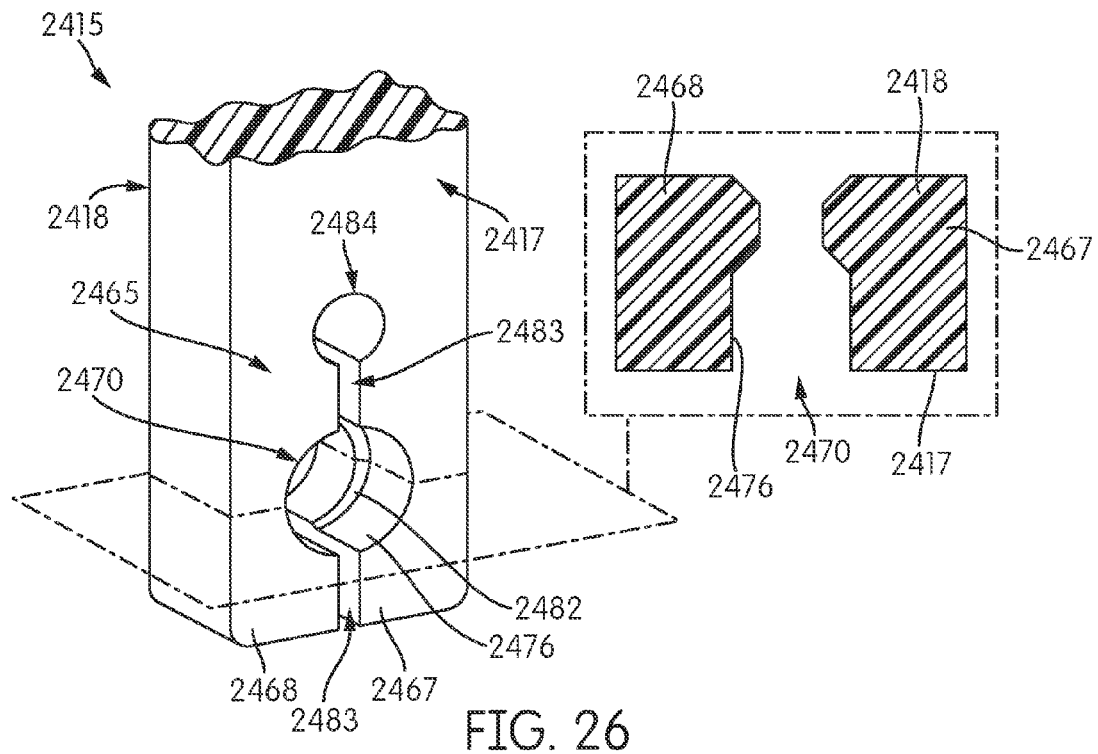
FIG. 26 is an enlarged, perspective and cross-sectional view of an inner side of the conveyor belt embodiment of FIG. 24.

FIG. 26 is an enlarged, perspective and cross-sectional view of an inner side of the conveyor belt embodiment of FIG. 24 (i.e., the reverse side of the view in FIG. 25). Accordingly, FIG. 26 illustrates shoulder 2482 in the perspective portion of FIG. 26.

Figure 27:
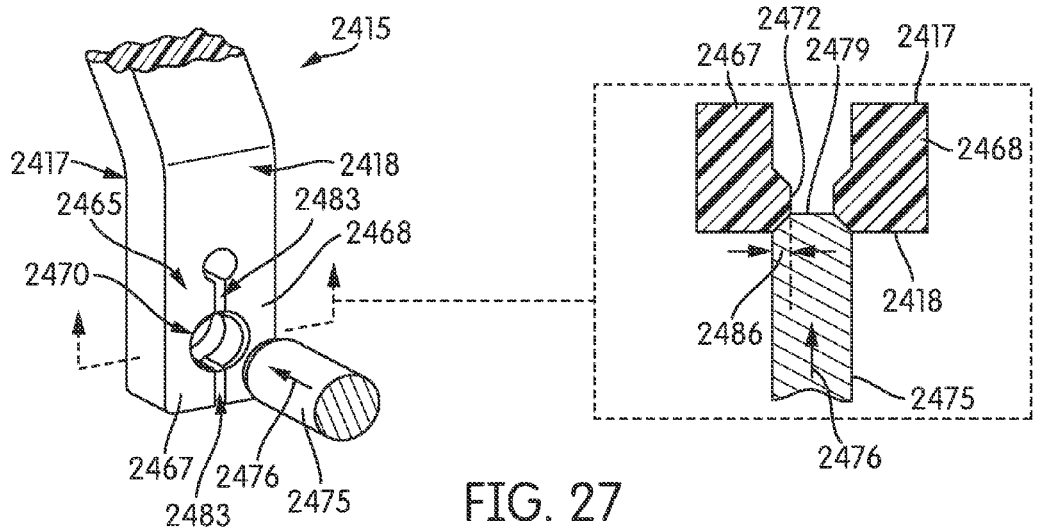
FIG. 27 is an enlarged, perspective and cross-sectional view of an outer side of the conveyor belt embodiment of FIG. 24, showing part of the process of assembling the conveyor belt components.

FIG. 27 is an enlarged, perspective and cross-sectional view of an outer side of the conveyor belt embodiment of FIG. 24, showing part of the process of assembling the conveyor belt components. During assembly, connecting rod 2475 may be inserted in a lateral direction, indicated by an arrow 2476. While connecting rod 2475 is shown spaced from outer leg 2415 in the perspective portion of FIG. 27, for purposes of illustration, connecting rod 2475 is shown with its leading end 2479 abutting the outer edge of opening 2470 in the cross-sectional portion of FIG. 27, also for purposes of illustration.

As shown in FIG. 27, connecting rod 2475 may have a diameter that is larger than outer portion 2472 of opening 2470. This difference in diameter is indicated in FIG. 27 by a dimension 2486. First section 2467 and second section 2468 may be configured to be deflected away from one another, from an undeflected position to a deflected position, to thereby enlarge opening 2470 when connecting rod 2475 is inserted into outer portion 2472 of opening 2470.

Figure 28:
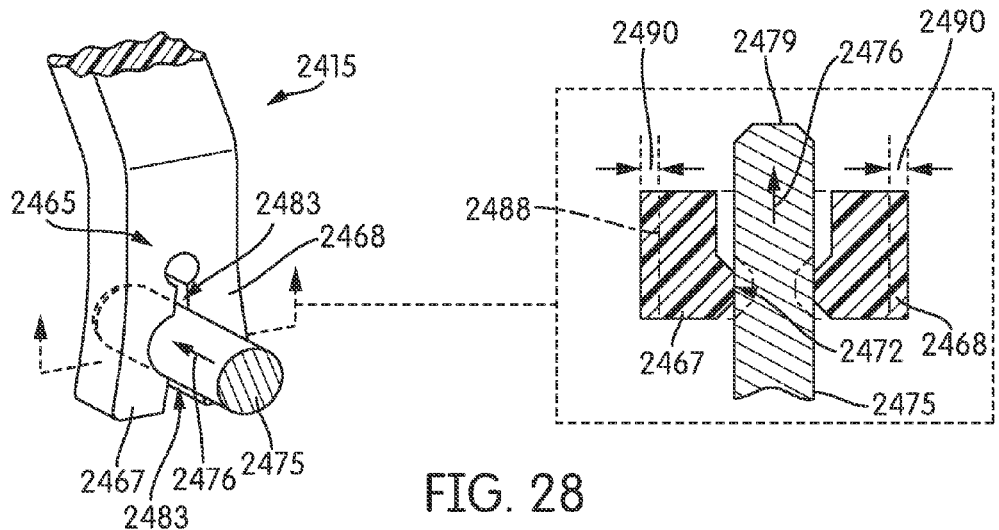
FIG. 28 is an enlarged, perspective and cross-sectional view of an outer side of the conveyor belt embodiment of FIG. 24, showing another part of the process of assembling the conveyor belt components.

FIG. 28 shows the next stage of the insertion process where connecting rod 2475 has been further inserted in direction 2476. In FIG. 28, leading end 2479 of connecting rod 2475 has passed through outer leg 2415, but a main body of connecting rod 2475 remains within opening 2470. As illustrated in FIG. 28, the presence of connecting rod 2475 within outer portion 2472 of opening 2470 forces first section 2467 and second section 2468 apart a distance 2490 (labeled in the cross-sectional portion of FIG. 28), which is substantially equivalent to the difference in the diameter of connecting rod 2475 and outer portion 2472 illustrated as dimension 2486. Deflection of first section 2467 and second section 2468 is also illustrated in the perspective portion of FIG. 28.

Figure 29:
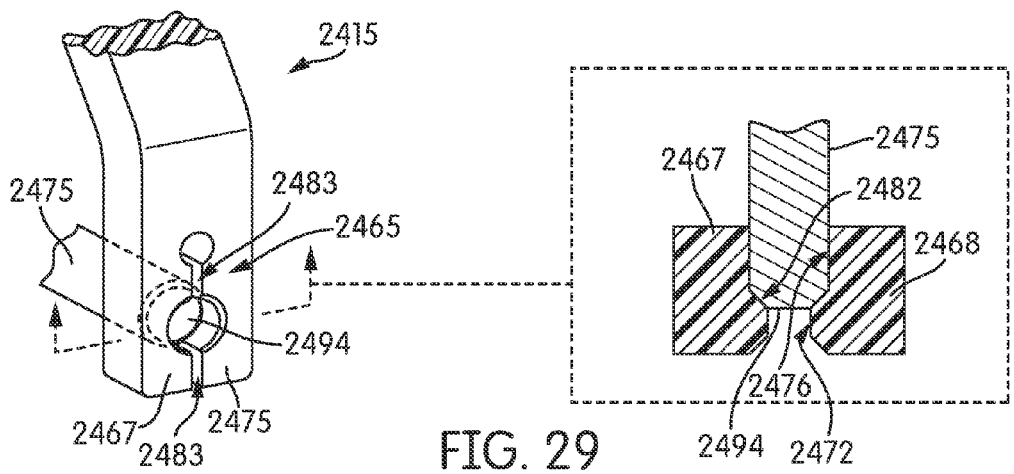
FIG. 29 is an enlarged, perspective and cross-sectional view of an outer side of the conveyor belt embodiment of FIG. 24, showing another part of the process of assembling the conveyor belt components.

FIG. 29 shows the configuration of the components when the rod insertion process has been completed. Notably, a terminal end 2494 of connecting rod 2475 has been inserted inwardly beyond outer portion 2472, allowing first section 2467 and second section 2468 of outer leg 2415 to return to their undeflected positions. Connecting rod 2475 is now disposed in inner portion 2476 of opening 2470 and retraction of connecting rod 2475 is prevented by shoulder 2482.

The features of rod retaining feature 2465, including opening 2470, may be formed by any suitable method. For example, these features may be formed by machining, molding, or any other suitable formation method.

Although unintentional removal of connecting rod 2475 is prevented by shoulder 2482, intentional removal of connecting rod 2475 may be allowed by forcing first section 2467 and second section 2468 apart. For example, a flat blade screw driver may be inserted into slit 2483 at the free end of outer leg 2415 and twisted to expand opening 2470, thereby allowing connecting rod 2475 to be removed past shoulder 2482. Accordingly, conveyor belt 2400 may be disassembled for maintenance, repair, and/or replacement of components.

Figure 30:
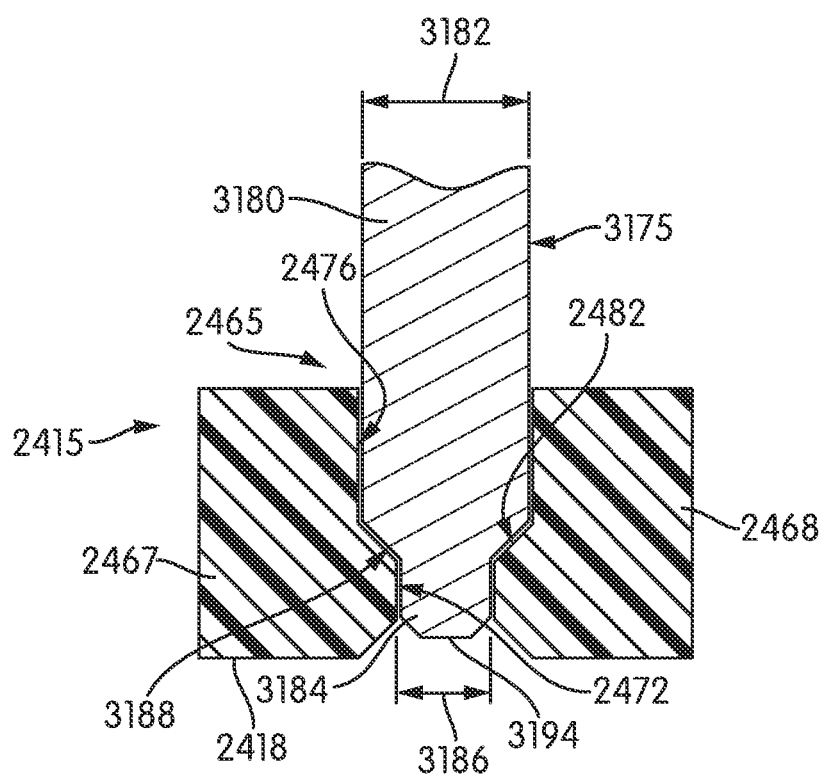
FIG. 30 is a cross-sectional view of the rod retention feature of the conveyor belt of FIG. 24, shown assembled with an alternative connecting rod embodiment.

FIG. 30 is a cross-sectional view of the rod retention feature of the conveyor belt of FIG. 24, shown assembled with an alternative connecting rod embodiment. As illustrated in FIG. 30, a stepped connecting rod 3175 may be utilized with rod retention feature 2465. A first portion 3184 of connecting rod 3175 may have a first diameter 3186, which may be substantially similar or slightly smaller than the diameter of outer portion 2472 of opening 2470. In addition, a second portion 3180 of connecting rod 3175 may have a second diameter 3182, which may substantially the same or slightly smaller than the diameter of inner portion 2476 of opening 2470. In some embodiments, second portion 3180 may constitute a substantial majority of the length of connecting rod 3175. Thus, the stepped portions of connecting rod 3175 may correspond with the stepped portions of opening 2470. Further, a transition 3188 between first portion 3184 and second portion 3180 of connecting rod 3175 may correspond with shoulder 2482, and may be similarly beveled.

As shown in FIG. 30, this stepped configuration of connecting rod 3175 may facilitate insertion without tools. For example, in some embodiments, outer portion 2472 may be too narrow for an assembly worker to insert their finger and, therefore, a tool may be used to push connecting rod 2475 into opening 2470 beyond outer portion 2472. However, first portion 3184 of connecting rod 3175 may have a length that is substantially the same outer portion 2472 of opening 2470. Therefore, due to the extension of first portion 3184 of stepped connecting rod 3175, connecting rod 3175 may include a trailing end 3194, which may, when connecting rod 3175 is fully inserted, be disposed substantially near (or substantially flush with) outer surface 2418 of outer link 2415. Accordingly, an assembly worker may fully insert connecting rod 3175 by hand, as they may be able to keep a finger on trailing end 3194 until connecting rod 3175 is fully inserted.

An additional benefit to the stepped connecting rod configuration is that, when connecting rod 3175 is fully inserted, opening 2470 is substantially completely filled, whereas, with connecting rod 2475 is fully inserted, outer portion 2472 remains vacant. By filling outer portion 2472, the possibility of debris, such as food, being trapped in outer portion 2472 during use of conveyor belt 2400.

An additional feature that is contemplated, but not shown, is an extension from trailing end 3194 that may provide a feature by which connecting rod 3175 may be gripped in order to remove connecting rod 3175 for maintenance. In some embodiments, this extension may be an additional flange or handle that protrudes from trailing end 3194. In other embodiments, first portion 3184 may simply be longer, such that it sticks out slightly from outer surface 2418 of outer leg 2415, allowing fingers or a tool, such as pliers, to grip trailing end 3184. This type of feature may be beneficial as, in some embodiments, the connecting rod may be fully enclosed within the links of pitches along its entire length, and thus, may not provide any rod surface that may be gripped in order to remove the rod.

For higher load uses of rod retention feature 2465, the free end of outer leg 2415 may be reinforced with an additional element to prevent the connecting rod from slipping out through slit 2483. For example, in some embodiments, once the connecting rod has been fully inserted, and first section 2467 and second section 2468 have returned to their undeflected positions, a band or clamp may installed over the free end of outer leg 2415 to hold first section 2467 and second section 2468 together during use, so the connecting rod does not slip out through slit 2483. In some embodiments, such a band may be hingedly mounted on the free end of outer leg 2415. In other embodiments, the band may be installed as a separate item. The band or clamp may be installed using any suitable method, such as a friction fit, crimping, fasteners, or any other suitable method. In other embodiments, first and second sections 2467, 2468 at the free end of outer leg 2415 may be held together with a fastener, such as a bolt.

In an unbanded configuration, it may be appropriate to implement rod retention feature 2465 in low stress applications, such as light duty conveyor belts that are not required to carry heavy loads. Another example of low stress applications may include interior edges of spiral conveyor belts. In spiral conveyor belts, the outer edge of the curve experiences relatively higher loads, and the interior edge of the curve typically experiences significantly lower loads. Accordingly, it may be appropriate, for example, to utilize a rod retention feature such as rod retention feature 2465 on an interior edge of the curve of a spiral conveyor belt.

The rod retaining features discussed herein may be used in many different types of conveyor belts and may be combined with other technologies intended to simplify the manufacturing of conveyor belts. For example, the rod retaining features discussed herein may be combined with link aperture alignment features that ease the proper aligning of link apertures so that connecting rods may be swiftly inserted. Embodiments of such link aperture alignment features are disclosed in U.S. Patent Publication Number 2013/0140147; and U.S. Patent Publication Number 2013/0140148, each of which is filed on even date herewith, is entitled "Conveyor Belt with Alignment Features," and is incorporated herein in its entirety by reference.

The features discussed herein may be used in many different types of conveyor belts and may be combined with other technologies intended to simplify the manufacturing of conveyor belts. For example, the rod retention concepts mentioned above may be combined with link alignment features and/or composite link features.

While various embodiments of the current embodiments have been described, the description is intended to be exemplary, rather than limiting and it will be apparent to those of ordinary skill in the art that many more embodiments and implementations are possible that are within the scope of the current embodiments. Accordingly, the current embodiments are not to be restricted except in light of the attached claims and their equivalents. Features of any embodiment described in the present disclosure may be included in any other embodiment described in the present disclosure. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method and/or process should not be limited to the performance of their steps in the order written, and one skilled in the art can readily appreciate that the sequences may be varied.

What is claimed is:

1. A pitch for a modular conveyor belt having a centerline extending through the pitch, the pitch comprising:
   a link having a first leg,
   an opening formed in the first leg,
   the opening defined by a first side edge and an opposite second side edge, a first edge that joins the first side edge to the opposite second side edge, and a second edge opposite the first edge that joins the first side edge to the opposite second side edge; and
   a projection associated with the first edge;
   wherein, in a first position, the projection extends away from the first edge towards the second edge so that a free end of the projection is positioned proximate the second edge and on the centerline, and wherein the projection is configured to deflect to a second position, in which the free end of the projection is deflected within the opening towards one of the first side edge and the second side edge.

2. The pitch of claim 1, wherein the projection is configured to deflect a deflection distance that is sufficient to permit a conveyor belt connecting rod to pass through the opening.

3. The pitch of claim 1, wherein, when the projection is in the first position, the projection prevents a conveyor belt connecting rod from being passed through the opening.

4. The pitch of claim 1, further comprising a second leg connected to the first leg to form a U-shaped link.

5. The pitch of claim 1, wherein the first leg comprises a lateral terminus of the conveyor belt.

6. The pitch of claim 1, wherein the first leg has a thickness and the projection has a thickness that is less than the thickness of the first leg.

7. The pitch of claim 6, wherein the thickness of the projection is approximately one half of the thickness of the first leg.

8. The pitch of claim 1, wherein the first leg has a thickness and the projection has a thickness that is less than the thickness of the first leg.

9. The pitch of claim 8, wherein the thickness of the projection is approximately one half of the thickness of the first leg.

10. The pitch of claim 1, wherein the opening is provided in a retention cage that extends outward from the first link, wherein the retention cage is continuous with the first link.

11. The pitch of claim 10, wherein the projection is configured to, in a first, undeflected position, prevent insertion and removal of a connecting rod through the opening and, in a second, deflected position wherein the projection is deflected in a direction perpendicular to the substantially lateral direction, the projection allows insertion and removal of the connecting rod through the opening.

12. The pitch of claim 1, wherein the first side edge and the second side edge are each substantially equidistant from the centerline.

13. The pitch of claim 1, wherein the projection extends along the centerline.

14. A method for assembling a conveyor belt, comprising:
providing an end link having a first opening on a first side of the end link and a second opening on a second side of the end link, wherein a flexible projection extends in a first position from an inner surface of the end link proximate the second opening so that in the first position the flexible projection is configured to prevent objects from entering the second opening, wherein the flexible projection is substantially parallel to the second side of the end link;
providing a connecting rod, wherein the connecting rod is an elongated member having a first rod end and a second rod end;
applying a force to the flexible projection to move a free end of the flexible projection to a second position proximate a side of the second opening, wherein the flexible projection is moved in a first direction, wherein the first direction is substantially perpendicular to the second side of the end link;
inserting the first rod end into the second opening, wherein the connecting rod is inserted in a second direction, wherein the second direction is substantially perpendicular to the first direction;
moving the first rod end into the first opening in the end link so that the second rod end is positioned proximate the second opening within the end link; and
releasing the force applied to the flexible projection so that the flexible projection returns to the first position to retain the connecting rod within the end link.

15. The method of claim 14, wherein applying the force is performed with a tool.

16. The method of claim 15, wherein the tool comprises at least one of a screwdriver and a file.

17. The method of claim 14, wherein applying the force is performed with the connection rod.

18. The method of claim 14, wherein applying the force is performed with a finger.

19. The method of claim 14, further including repeating the steps to form a conveyor belt having a desired length.

20. The method of claim 14, wherein the portion of the projection is rotated about a hinge point positioned on the inner surface.

21. The method of claim 14, wherein the opening is provided in a retention cage that extends outward from a leg of the end link.

22. A modular conveyor belt, comprising:
a connecting rod; and
a pitch, the pitch having a first link, the first link having a first leg;
a retention cage extending away from the first leg, the retention cage including a first side formed by at least part of the first leg of the link, a front side extending in a substantially lateral direction away from the first leg of the link, a rear side extending substantially laterally from the first leg of the link, and a laterally outer side connecting the front side and the rear side of the retention cage such that the first side, front side, rear side, and laterally outer side define an interior portion, wherein the laterally outer side includes an opening configured to receive a connecting rod;
a projection extending within the opening;
wherein the opening is defined by a first surface, an opposite second surface, a first edge positioned substantially perpendicular to the first surface and joining the first surface to the opposite second surface, wherein a centerline of the pitch passes perpendicularly through a midpoint of the pitch,
wherein, in a first position, a free end of the projection extends along the centerline so that the projection prevents insertion or removal of the connecting rod through the opening.

23. The conveyor belt of claim 22, wherein the first link includes a second leg connected to the first leg by a connecting portion to form a U-shaped link.

24. The conveyor belt of claim 22, wherein the first leg comprises a lateral terminus of the conveyor belt.

25. The conveyor belt of claim 22, wherein the opening includes a rod supporting portion configured to cradle at least a portion of the connecting rod during or after insertion.

26. A modular conveyor belt comprising:
an elongated rod having an elongation axis that extends along a length of the rod in the direction of the elongation of the rod;
a pitch configured to receive the elongated rod, the pitch having a centerline that extends through a midpoint of the pitch in a direction perpendicular to the elongation axis;
a link of the pitch, the link having a first leg;
a retention cage extending away from the first leg, the retention cage including a first wall formed by at least part of the first leg of the link, a second wall opposite to and spaced apart from the first wall, a third wall extending away from the first leg of the link, wherein the third wall joins the first wall and the second wall, a fourth wall extending away from the first leg of the link, wherein the fourth wall joins the first wall and the second wall so that the first wall, the second wall, the third wall, and the fourth wall define an interior portion;
a first aperture formed in the first wall, wherein the first aperture is configured to receive the elongated rod;

a second aperture formed in the second wall, wherein the second aperture is configured to receive the elongated rod;

a projection having a first end attached to an attachment point positioned on one of the third wall and the fourth wall and a second end, wherein the projection is disposed within the interior portion between the first wall and the second wall;

wherein, in a first position, the second end of the projection is a free end positioned on the centerline, and wherein the projection is configured to deflect to a second position, in which the second end of the projection is deflected in a direction that is perpendicular to both the elongation axis and the centerline.

27. The modular conveyor belt of claim 26, wherein the projection is spaced apart from the first wall.

28. The modular conveyor belt of claim 26, wherein the projection is spaced apart from the second wall.

29. The modular conveyor belt of claim 26, wherein the projection is spaced apart from the first wall and the second wall.

30. The modular conveyor belt of claim 26, wherein the link is a terminal link of the pitch.

31. The modular conveyor belt of claim 26, wherein the projection is biased so that the projection tends to align with the centerline when no force is applied to the projection.

* * * * *